(12) United States Patent
Yanagida et al.

(10) Patent No.: US 12,403,876 B2
(45) Date of Patent: Sep. 2, 2025

(54) VEHICLE BRAKE SYSTEM

(71) Applicant: DENSO CORPORATION, Kariya (JP)

(72) Inventors: Etsugou Yanagida, Kariya (JP);
Daisuke Hokuto, Kariya (JP); Kunio Nanba, Kariya (JP)

(73) Assignee: DENSO CORPORATION, Kariya (JP)

( * ) Notice: Subject to any disclaimer, the term of this patent is extended or adjusted under 35 U.S.C. 154(b) by 536 days.

(21) Appl. No.: 17/835,096

(22) Filed: Jun. 8, 2022

(65) Prior Publication Data

US 2022/0297649 A1    Sep. 22, 2022

Related U.S. Application Data

(63) Continuation of application No. PCT/JP2020/046371, filed on Dec. 11, 2020.

(30) Foreign Application Priority Data

Dec. 13, 2019 (JP) ................ 2019-225659

(51) Int. Cl.
*B60T 8/32* (2006.01)
*B60T 7/04* (2006.01)
(Continued)

(52) U.S. Cl.
CPC .............. *B60T 8/326* (2013.01); *B60T 7/042* (2013.01); *B60T 8/172* (2013.01); *B60T 11/103* (2013.01);
(Continued)

(58) Field of Classification Search
CPC ........ B60T 8/326; B60T 17/221; B60T 7/042; B60T 8/172; B60T 8/171; B60T 13/686;
(Continued)

(56) References Cited

U.S. PATENT DOCUMENTS 9,278,676 B2 *   3/2016  Nishino .................. B60T 8/321
2020/0139949 A1   5/2020  Dolmaya et al.
2020/0164842 A1   5/2020  Ishida et al.

FOREIGN PATENT DOCUMENTS

DE   10 2016 213994      2/2018
JP       2000312444 A   11/2000
(Continued)

OTHER PUBLICATIONS

WO document No. 2014184840 to Nakaoka et al published on Nov. 20, 2014.*
(Continued)

*Primary Examiner* — Pamela Rodriguez
(74) *Attorney, Agent, or Firm* — Nixon & Vanderhye P.C.

(57) ABSTRACT

A vehicle brake system includes a vehicle brake device and a hydraulic pressure generation unit. The vehicle brake device includes: a brake pedal that has a pedal portion, and a lever portion rotating about a rotation axis in response to the pedal portion being operated; a stroke sensor that outputs a signal based on a stroke amount of the brake pedal; a housing that rotatably supports the lever portion; and a reaction force generation portion that generates a reaction force applied on the lever portion based on the stroke amount. The hydraulic pressure generation unit generates a hydraulic pressure for braking a vehicle.

2 Claims, 22 Drawing Sheets

(51) Int. Cl.
  *B60T 8/172* (2006.01)
  *B60T 11/10* (2006.01)
  *B60T 13/68* (2006.01)
  *B60T 17/22* (2006.01)

(52) U.S. Cl.
  CPC .......... *B60T 13/686* (2013.01); *B60T 17/221* (2013.01); *B60T 2270/402* (2013.01); *B60T 2270/413* (2013.01)

(58) Field of Classification Search
  CPC ............. B60T 11/103; B60T 2270/402; B60T 2270/413; B60T 13/662; B60T 2220/04
  See application file for complete search history.

(56) References Cited

FOREIGN PATENT DOCUMENTS

| JP | 2018-016161 | 2/2018 |
|---|---|---|
| JP | 2019119340 A | 7/2019 |
| JP | 2019-135128 | 8/2019 |

OTHER PUBLICATIONS

Japanese Patent No. JP 2018-016162 to Ishida et al published on Feb. 1, 2018.*
WO document No. 2019-107235 to Mizusaki et al published on Jun. 6, 2019.*
WO document No. 2019142628 to Wakabayashi published on Jul. 25, 2019.*

* cited by examiner

VEHICLE BRAKE SYSTEM

CROSS REFERENCE TO RELATED APPLICATIONS

The present application is a continuation application of International Patent Application No. PCT/JP2020/046371 filed on Dec. 11, 2020, which designated the U.S. and claims the benefit of priority from Japanese Patent Application No. 2019-225659 filed on Dec. 13, 2019. The entire disclosures of all of the above applications are incorporated herein by reference.

TECHNICAL FIELD

The present disclosure relates to a vehicle brake system.

BACKGROUND

A vehicle brake system including a main power supply and a sub power supply has been proposed.

SUMMARY

The present disclosure provides a vehicle brake system. The vehicle brake system includes a vehicle brake device and a hydraulic pressure generation unit. The vehicle brake device includes: a brake pedal that has a pedal portion, and a lever portion rotating about a rotation axis in response to the pedal portion being operated; a stroke sensor that outputs a signal based on a stroke amount of the brake pedal; a housing that rotatably supports the lever portion; and a reaction force generation portion that generates a reaction force applied on the lever portion based on the stroke amount. The hydraulic pressure generation unit generates a hydraulic pressure for braking a vehicle.

BRIEF DESCRIPTION OF DRAWINGS

The features and advantages of the present disclosure will become more apparent from the following detailed description made with reference to the accompanying drawings. In the drawings.

DETAILED DESCRIPTION

According to the inventors' studies, even when the main power supply and the sub power supply are provided, a vehicle may not be braked if a drive circuit for driving an actuator such as a motor fails. Thus, redundancy of the system may not be ensured in some cases.

The present disclosure provides a vehicle brake system that improves redundancy of the system.

An exemplary embodiment of the present disclosure provides a vehicle brake system that includes a vehicle brake device, a hydraulic pressure generation unit, a hydraulic pressure control device, a first power supply, and a second power supply. The vehicle brake device includes: a brake pedal that has a pedal portion, and a lever portion rotating about a rotation axis in response to the pedal portion being operated; a stroke sensor that outputs a signal based on a stroke amount of the brake pedal; a housing that rotatably supports the lever portion; and a reaction force generation portion that generates a reaction force applied on the lever portion based on the stroke amount. The hydraulic pressure generation unit generates a hydraulic pressure for braking a vehicle. The hydraulic pressure control device includes: a first drive circuit that drives the hydraulic pressure generation unit; and a second drive circuit that drives the hydraulic pressure generation unit. The hydraulic pressure control device controls the first drive circuit and the second drive circuit based on the signal from the stroke sensor to control the hydraulic pressure generated by the hydraulic pressure generation unit. The first power supply supplies power to the hydraulic pressure control device. The second power supply supplies power to the hydraulic pressure control device.

In the exemplary embodiment of the present disclosure, the redundancy of the vehicle brake system can be improved.

Hereinafter, embodiments will be described with reference to the drawings. In the following embodiments, the same or equivalent portions are denoted by the same reference signs, and the description thereof will be omitted.

First Embodiment

A vehicle brake system 1 according to a first embodiment controls a left front wheel FL, a right front wheel FR, a left rear wheel RL, and a right rear wheel RR, which are the wheels of a vehicle 6. First, the vehicle brake system 1 will be described.

Figure 1:
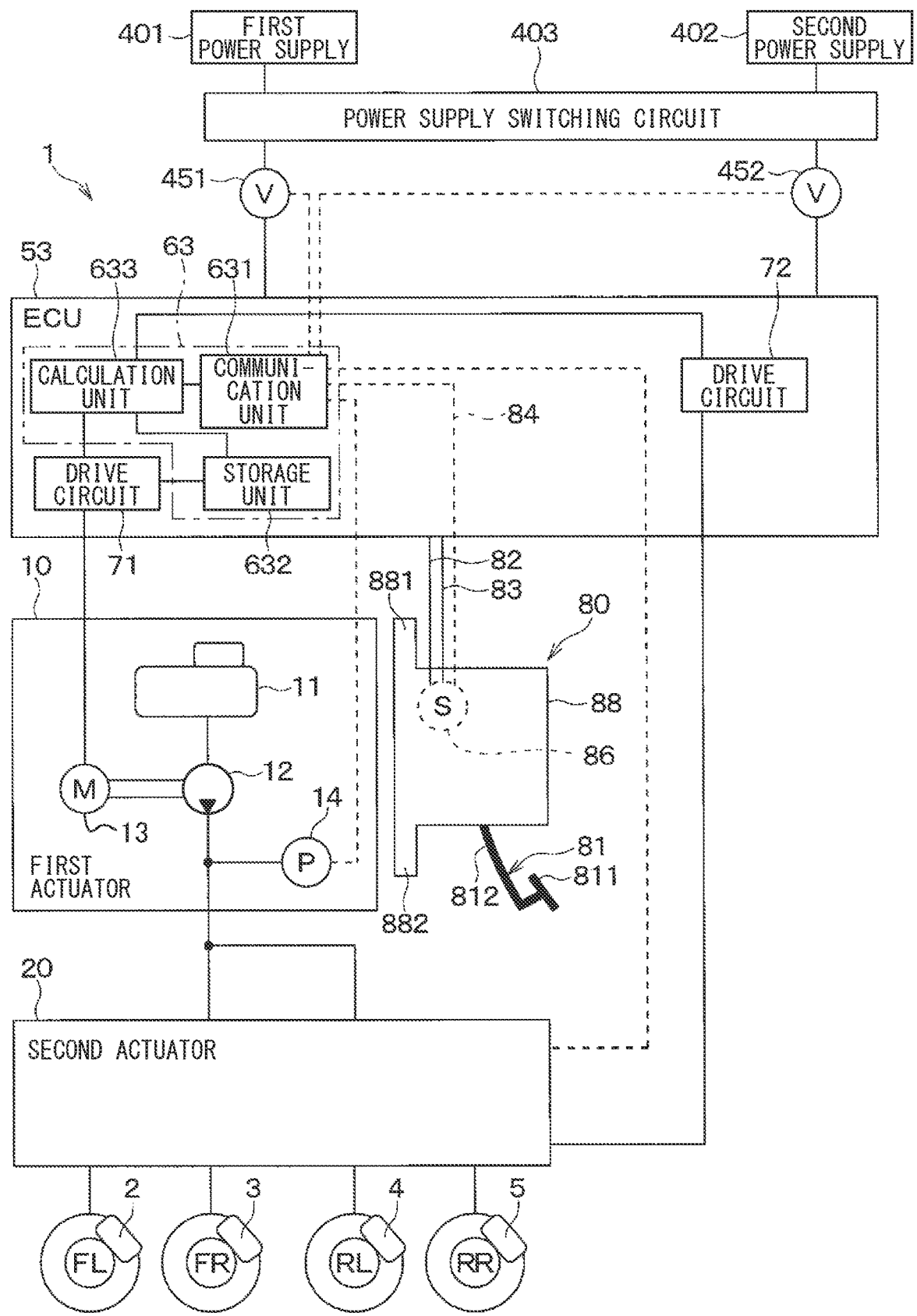
FIG. 1 is a configuration diagram of a vehicle brake system according to a first embodiment.

As illustrated in FIG. 1, the vehicle brake system 1 includes a wheel cylinder for the left front wheel, a wheel cylinder for the right front wheel, a wheel cylinder for the left rear wheel, and a wheel cylinder for the right rear wheel. The vehicle brake system 1 further includes a first actuator 10, a second actuator 20, a first power supply 401, a first voltage sensor 451, a second power supply 402, a second voltage sensor 452, a power supply switching circuit 403, an ECU 53, and a vehicle brake device 80. Hereinafter, each of the wheel cylinders is referred to as the W/C for convenience. The ECU is an abbreviation for Electronic Control Unit.

The left front wheel W/C 2 is disposed on the left front wheel FL. The right front wheel W/C 3 is disposed on the right front wheel FR. The left rear wheel W/C 4 is disposed on the left rear wheel RL. The right rear wheel W/C 5 is disposed on the right rear wheel RR. The left front wheel W/C 2, the right front wheel W/C 3, the left rear wheel W/C 4, and the right rear wheel W/C 5 are connected to respective brake pads (not illustrated) of the vehicle 6.

The first actuator 10 corresponds to a first hydraulic pressure generation unit, and generates a brake hydraulic pressure. The first actuator 10 increases the brake hydraulic pressures to cause respective brake hydraulic pressures of the left front wheel W/C 2, the right front wheel W/C 3, the left rear wheel W/C 4, and the right rear wheel W/C 5 to increase. Specifically, the first actuator 10 includes a reservoir 11, a first pump 12, a first actuator motor 13, and a first pressure sensor 14.

The reservoir 11 stores a brake fluid such as oil or the like, and also supplies the brake fluid to the first pump 12.

The first pump 12 is driven by the first actuator motor 13, which corresponds to a first motor. With this driving, the first pump 12 increases a pressure of the brake fluid from the reservoir 11. The brake fluid with the increased hydraulic pressure flows from the first actuator 10 to the second actuator 20.

The first pressure sensor 14 outputs, to the ECU 53, a signal being in accordance with the hydraulic pressure of the brake fluid flowing to the second actuator 20.

Figure 2:
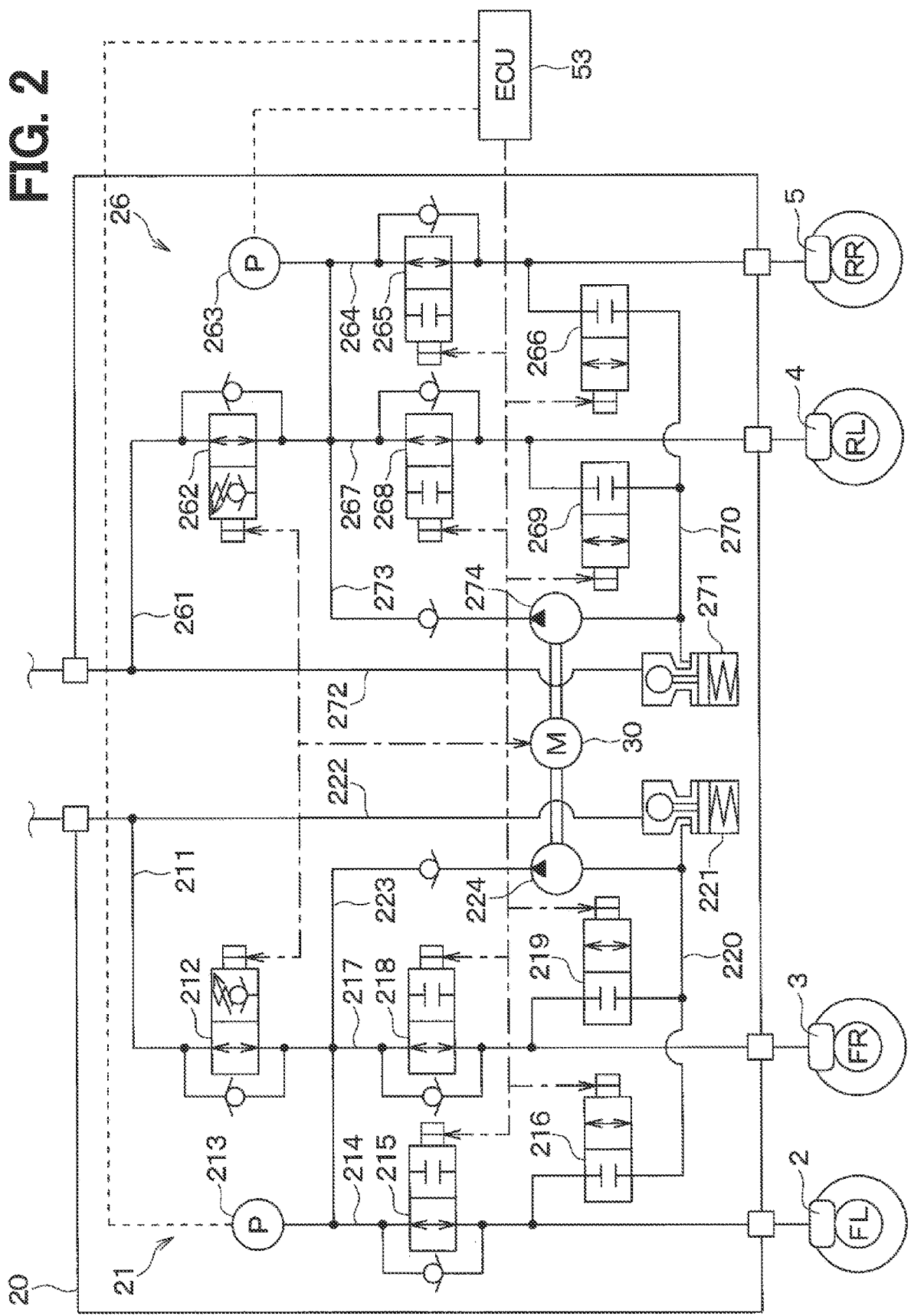
FIG. 2 is a configuration diagram of a second actuator.

The second actuator 20 corresponds to a second hydraulic pressure generation unit, and generates brake hydraulic pressures. The second actuator 20 controls the respective brake hydraulic pressures of the left front wheel W/C 2, the right front wheel W/C 3, the left rear wheel W/C 4, and the right rear wheel W/C 5, based on signals from the ECU 53 described later. For example, as illustrated in FIG. 2, the second actuator 20 includes a first piping system 21, a second piping system 26, and a second actuator motor 30.

The first piping system 21 controls the brake hydraulic pressures of the left front wheel W/C 2 and the right front wheel W/C 3. Specifically, the first piping system 21 includes a first main pipe line 211, a first differential pressure control valve 212, a second pressure sensor 213, a first branch pipe line 214, a first pressure increase control valve 215, and a first pressure reduction control valve 216. The first piping system 21 also includes a second branch pipe line 217, a second pressure increase control valve 218, a second pressure reduction control valve 219, a first pressure reduction pipe line 220, a first pressure adjustment reservoir 221, a first auxiliary pipe line 222, a first return-flow pipe line 223, and a second pump 224.

The first main pipe line 211 is connected to the first actuator 10, and transmits the brake hydraulic pressure from the first actuator 10 to the first differential pressure control valve 212.

The first differential pressure control valve 212 controls a differential pressure between an upstream side and a downstream side of the first main pipe line 211 using a signal from the ECU 53 described later. For example, when the brake hydraulic pressures on sides of the left front wheel W/C 2 and the right front wheel W/C 3 are higher than the brake hydraulic pressure on the side of the first actuator 10 by a predetermined pressure or higher, the first differential pressure control valve 212 allows a flow of the brake fluid from the sides of the left front wheel W/C 2 and the right front wheel W/C 3 to the side of the first actuator 10. As a result, the brake hydraulic pressures on the sides of the left front wheel W/C 2 and the right front wheel W/C 3 are maintained so as not to be higher than the brake hydraulic pressure on the side of the first actuator 10 by a predetermined pressure or higher.

The second pressure sensor 213 outputs a signal being in accordance with the brake hydraulic pressure on the downstream side of the first differential pressure control valve 212 to the ECU 53 described later.

The first branch pipe line 214 directs the brake fluid flowing from the first differential pressure control valve 212 to the first pressure increase control valve 215.

The first pressure increase control valve 215 is a normally open type two-position electromagnetic valve capable of controlling a communicating state and a blocking state. Specifically, when a solenoid coil (not illustrated) of the first pressure increase control valve 215 is in a non-energized state, the first pressure increase control valve 215 is in the communicating state, and thus allows a flow of the brake fluid to the left front wheel W/C 2 and the first pressure reduction control valve 216. When the solenoid coil (not illustrated) of the first pressure increase control valve 215 is in an energized state, the first pressure increase control valve 215 becomes the blocking state, and thus blocks the flow of the brake fluid to the left front wheel W/C 2 and the first pressure reduction control valve 216.

The first pressure reduction control valve 216 is a normally closed type two-position electromagnetic valve capable of controlling a blocking state and a communicating state. Specifically, when a solenoid coil (not illustrated) of the first pressure reduction control valve 216 is in a non-energized state, the first pressure reduction control valve 216 is in the blocking state, and thus blocks a flow of the brake fluid to the first pressure reduction pipe line 220 described later. When the solenoid coil (not illustrated) of the first pressure reduction control valve 216 is in an energized state, the first pressure reduction control valve 216 becomes the communicating state, and thus allows the flow of the brake fluid to the first pressure reduction pipe line 220 described later.

The second branch pipe line 217 directs the brake fluid flowing from the first differential pressure control valve 212 to the second pressure increase control valve 218.

Similar to the first pressure increase control valve 215, the second pressure increase control valve 218 is a normally open type two-position electromagnetic valve. Specifically, when a solenoid coil (not illustrated) of the second pressure increase control valve 218 is in a non-energized state, the second pressure increase control valve 218 is in a communicating state, and thus allows a flow of the brake fluid to the right front wheel W/C 3 and the second pressure reduction control valve 219. When the solenoid coil (not illustrated) of the second pressure increase control valve 218 is in an energized state, the second pressure increase control valve 218 becomes a blocking state, and thus blocks the flow of the brake fluid to the right front wheel W/C 3 and the second pressure reduction control valve 219.

Similar to the first pressure reduction control valve 216, the second pressure reduction control valve 219 is a normally closed type two-position electromagnetic valve. Specifically, when a solenoid coil (not illustrated) of the second pressure reduction control valve 219 is in a non-energized state, the second pressure reduction control valve 219 is in the blocking state, and thus blocks a flow of the brake fluid to the first pressure reduction pipe line 220 described later. When the solenoid coil (not illustrated) of the second pressure reduction control valve 219 is in an energized state, the second pressure reduction control valve 219 becomes the communicating state, and thus allows the flow of the brake fluid to the first pressure reduction pipe line 220 described later.

The first pressure reduction pipe line 220 directs the brake fluids flowing from the first pressure reduction control valve 216 and the second pressure reduction control valve 219 to the first pressure adjustment reservoir 221.

The first auxiliary pipe line 222 branches from the first main pipe line 211, and directs the brake fluid flowing from the first actuator 10 to the first pressure adjustment reservoir 221.

The first pressure adjustment reservoir 221 stores the brake fluids flowing from the first pressure reduction control valve 216 and the second pressure reduction control valve 219 through the first pressure reduction pipe line 220. The first pressure adjustment reservoir 221 also stores the brake fluid flowing from the first actuator 10 through the first auxiliary pipe line 222. Further, when the brake fluid is sucked by the second pump 224 described later, the first pressure adjustment reservoir 221 adjusts a flow rate of the stored brake fluid.

The first return-flow pipe line 223 is connected between the first differential pressure control valve 212 and each of the first pressure increase control valve 215 and the second pressure increase control valve 218. The first return-flow pipe line 223 is connected to the second pump 224.

The second pump 224 is connected to the first pressure reduction pipe line 220, and is driven by the second actuator motor 30, which corresponds to a second motor. With this driving, the second pump 224 sucks the brake fluid stored in the first pressure adjustment reservoir 221. The sucked brake fluid flows between the first differential pressure control valve 212 and each of the first pressure increase control valve 215 and the second pressure increase control valve 218 after the brake fluid flows through the first return-flow pipe line 223. As a result, the respective brake hydraulic pressures of the left front wheel W/C 2 and the right front wheel W/C 3 increase.

The second piping system 26 controls the brake hydraulic pressures of the left rear wheel W/C 4 and the right rear wheel W/C 5. Specifically, the second piping system 26 includes a second main pipe line 261, a second differential pressure control valve 262, a third pressure sensor 263, a third branch pipe line 264, a third pressure increase control valve 265, and a third pressure reduction control valve 266. The second piping system 26 also includes a fourth branch pipe line 267, a fourth pressure increase control valve 268, a fourth pressure reduction control valve 269, a second pressure reduction pipe line 270, a second pressure adjustment reservoir 271, a second auxiliary pipe line 272, a second return-flow pipe line 273, and a third pump 274.

Herein, the second piping system 26 is configured similarly to the first piping system 21. Thus, the left front wheel W/C 2 described above is replaced by the right rear wheel W/C 5. The right front wheel W/C 3 described above is replaced by the left rear wheel W/C 4. Further, the second main pipe line 261 corresponds to the first main pipe line 211. The second differential pressure control valve 262 corresponds to the first differential pressure control valve 212. The third pressure sensor 263 corresponds to the second pressure sensor 213. The third branch pipe line 264 corresponds to the first branch pipe line 214. The third pressure increase control valve 265 corresponds to the first pressure increase control valve 215. The third pressure reduction control valve 266 corresponds to the first pressure reduction control valve 216. The fourth branch pipe line 267 corresponds to the second branch pipe line 217. The fourth pressure increase control valve 268 corresponds to the second pressure increase control valve 218. The fourth pressure reduction control valve 269 corresponds to the second pressure reduction control valve 219. The second pressure reduction pipe line 270 corresponds to the first pressure reduction pipe line 220. The second pressure adjustment reservoir 271 corresponds to the first pressure adjustment reservoir 221. The second auxiliary pipe line 272 corresponds to the first auxiliary pipe line 222. The second return-flow pipe line 273 corresponds to the first return-flow pipe line 223. The third pump 274 corresponds to the second pump 224.

The first power supply 401 supplies power to the ECU 53.

The first voltage sensor 451 outputs, to the ECU 53, a signal being in accordance with a voltage applied from the first power supply 401 to the ECU 53.

The second power supply 402 supplies power to the ECU 53.

The second voltage sensor 452 outputs, to the ECU 53, a signal being in accordance with a voltage applied from the second power supply 402 to the ECU 53.

The power supply switching circuit 403 switches a power supply source that supplies power to the ECU 53 to either the first power supply 401 or the second power supply 402 based on a signal from the ECU 53 described later.

The ECU 53 corresponds to a hydraulic pressure control device, and controls the first actuator 10 by controlling the first actuator motor 13. The ECU 53 also controls the second actuator 20 by controlling the second actuator motor 30. Further, the ECU 53 switches the power supply source that supplies power to the ECU 53 to either the first power supply 401 or the second power supply 402 by controlling the power supply switching circuit 403. Specifically, the ECU 53 includes a microcomputer 63, a first drive circuit 71, and a second drive circuit 72.

The microcomputer 63 corresponds to a hydraulic pressure control unit, and controls the first actuator 10 by controlling the first drive circuit 71 described later. The microcomputer 63 controls the second actuator 20 by controlling the second drive circuit 72 described later. Specifically, the microcomputer 63 includes a communication section 631, a storage section 632, and a control calculation section 633.

The communication section 631 includes an interface for communicating with the first pressure sensor 14, an interface for communicating with the second pressure sensor 213, and an interface for communicating with the third pressure sensor 263. The communication section 631 also includes an interface for communicating with the first voltage sensor 451 and an interface for communicating with the second voltage sensor 452. The communication section 631 further includes an interface for communicating with a stroke sensor 86 of the vehicle brake device 80, described later.

The storage section 632 includes non-volatile memories such as a read-only memory (ROM) and a flash memory, and a volatile memory such as a random access memory (RAM). The non-volatile memories and the volatile memory are non-transitory tangible storage media.

The control calculation section 633 includes a central processing unit (CPU) and the like. The control calculation section 633 outputs a signal for driving the first actuator motor 13 to the first drive circuit 71 by executing a program stored in the ROM of the storage section 632. The control calculation section 633 also outputs a signal for driving the second actuator motor 30 to the second drive circuit 72 by executing a program stored in the ROM of the storage section 632. The control calculation section 633 further outputs, to the power supply switching circuit 403, the signal for switching the power supply source that supplies power to the ECU 53 by executing a program stored in the ROM of the storage section 632.

The first drive circuit 71 includes, for example, a switching element and the like, and drives the first actuator 10 by supplying power to the first actuator motor 13 based on the signal from the control calculation section 633.

The second drive circuit 72 includes, for example, a switching element and the like, and drives the second actuator 20 by supplying power to each valve of the second actuator 20 and the second actuator motor 30 based on the signal from the control calculation section 633.

Figure 3:
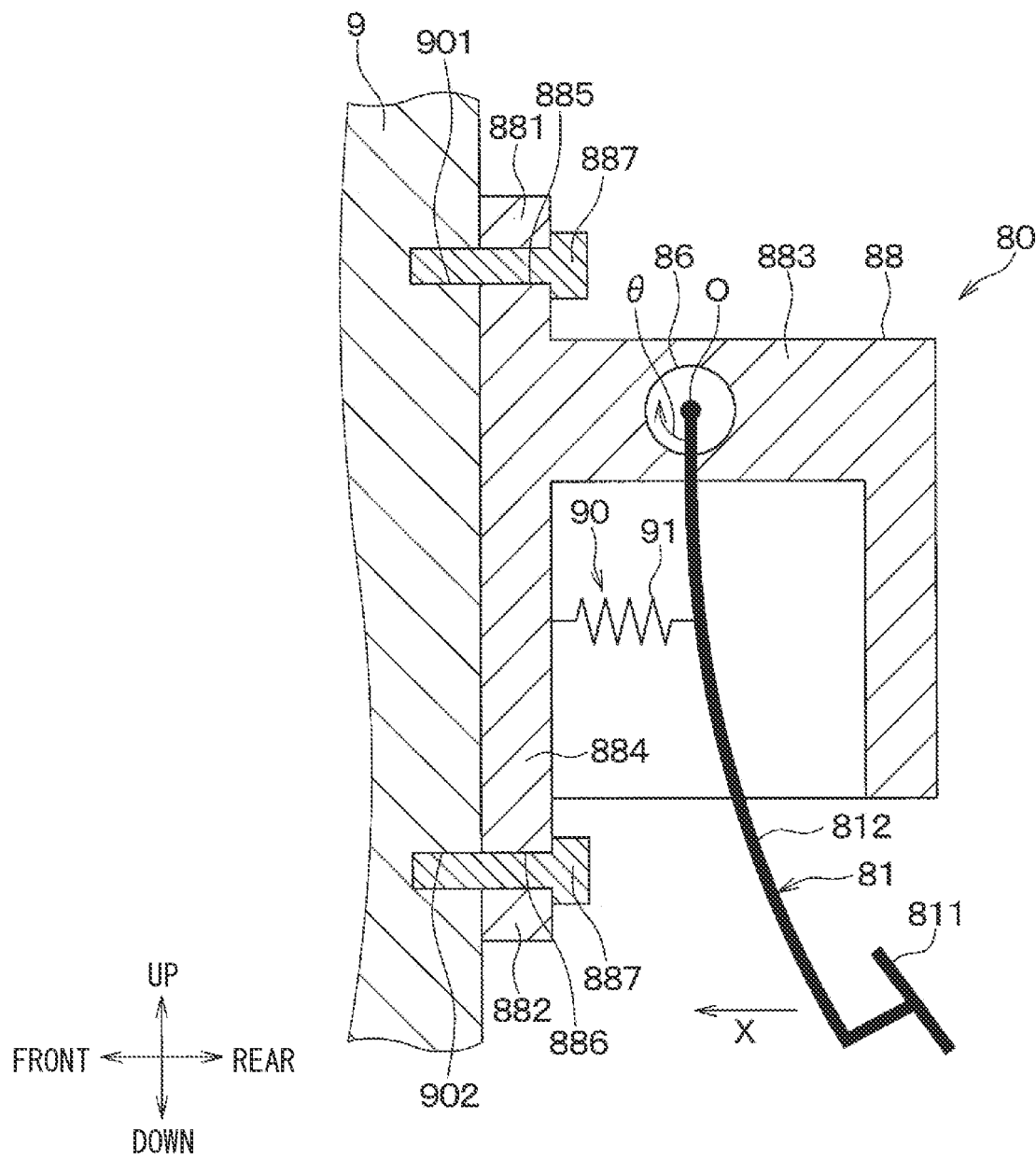
FIG. 3 is a cross-sectional view of a vehicle brake device.
Figure 4:
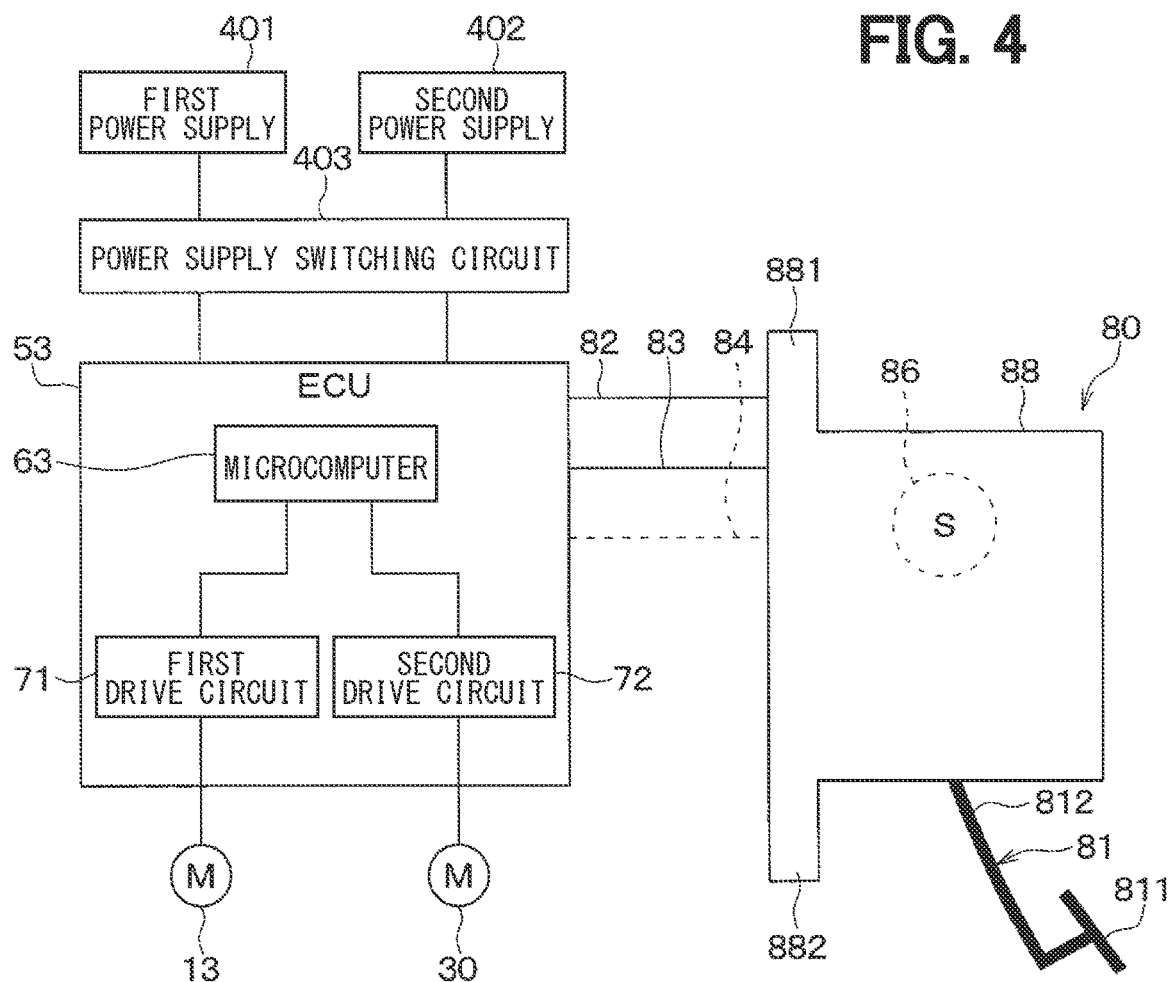
FIG. 4 is a wiring diagram of the vehicle brake system.

As illustrated in FIGS. 1, 3, and 4, the vehicle brake device 80 includes a brake pedal 81, a sensor power supply line 82, a sensor ground line 83, a sensor output line 84, the stroke sensor 86, a housing 88, and a reaction force generation portion 90.

The brake pedal 81 is operated by a driver of the vehicle 6 pressing the brake pedal 81. Specifically, the brake pedal 81 includes a pedal portion 811 and a lever portion 812. The pedal portion 811 is pressed by the driver of the vehicle 6. The lever portion 812 is connected to the pedal portion 811, and rotates about a rotation axis O when the pedal portion 811 is pressed by the driver of the vehicle 6.

As illustrated in FIGS. 1 and 4, the sensor power supply line 82 is connected to the ECU 53 and the stroke sensor 86 described later. With this connection, power from the first power supply 401 and the second power supply 402 is supplied to the stroke sensor 86 through the ECU 53 and the sensor power supply line 82.

The sensor ground line 83 is connected to the ECU 53 and the stroke sensor 86.

The sensor output line 84 is connected to the ECU 53 and the stroke sensor 86.

Figure 5:
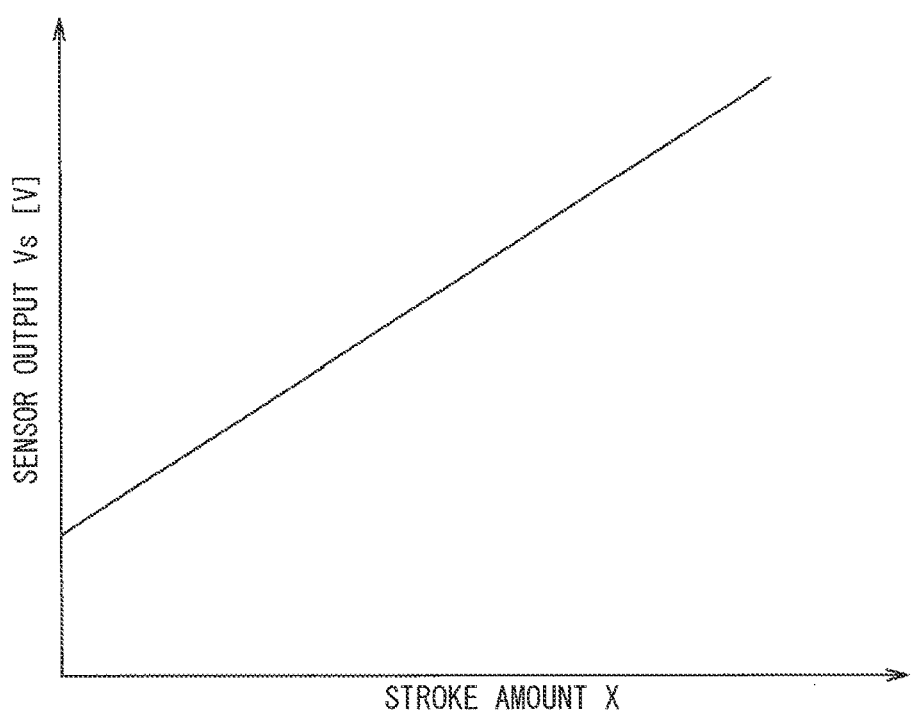
FIG. 5 is a diagram illustrating a relationship between stroke amount and sensor output.

As illustrated in FIG. 3, the stroke sensor 86 is disposed, for example, next to the rotation axis O of the lever portion 812. As illustrated in FIGS. 1 and 4, the stroke sensor 86 outputs a signal being in accordance with a stroke amount X to the ECU 53 through the sensor output line 84. The stroke amount X is an operation amount of the brake pedal 81 generated by a pedal force of the driver of the vehicle 6. Herein, the stroke amount X is, for example, an amount of translational movement of the pedal portion 811 toward the front of the vehicle 6. As illustrated in FIG. 5, the stroke amount X and a sensor output Vs of the stroke sensor 86 are adjusted to have a linear relationship. Herein, the sensor output Vs is expressed by, for example, voltage. Alternatively, the stroke sensor 86 may also output a signal being in accordance with a rotation angle θ about the rotation axis O of the lever portion 812 to the ECU 53 through the sensor output line 84. At this time, similarly to the relationship between the stroke amount X and the sensor output Vs, the rotation angle θ and the signal of the stroke sensor 86 are adjusted to have a linear relationship.

Figure 6:
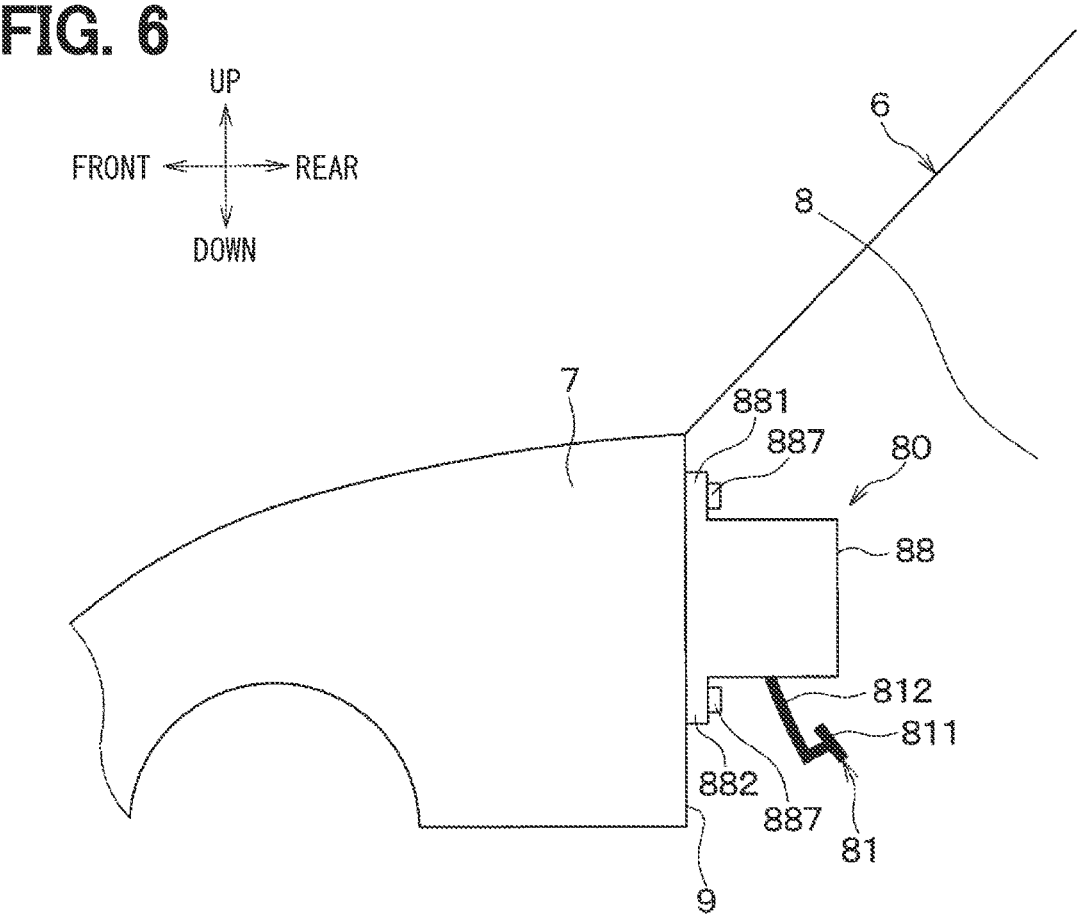
FIG. 6 is a view when the vehicle brake device is mounted to a vehicle.

As illustrated in FIGS. 3 and 6, the housing 88 is mounted to a dash panel 9, which is a partition wall that separates a cabin 8 from a non-cabin space 7 such as an engine compartment and the like of the vehicle 6. In some cases, the dash panel 9 is referred to as a bulkhead. In the non-cabin space 7, in addition to an engine of the vehicle 6, a battery, an air conditioning device, and the like of the vehicle 6 are disposed.

As illustrated in FIG. 3, the housing 88 is formed in a bottomed tubular shape, and includes a first mounting portion 881, a second mounting portion 882, a housing bottom portion 883, and a housing tubular portion 884. Herein, the upside with respect to the front of the vehicle 6 is simply referred to as the upside, for convenience of explanation. The downside with respect to the front of the vehicle 6 is simply referred to as the downside.

The first mounting portion 881 is connected to the housing bottom portion 883 described later, and extends upward from the housing bottom portion 883. The first mounting portion 881 includes a first mounting hole 885. The first mounting portion 881 is mounted to the dash panel 9 by inserting a bolt 887 into the first mounting hole 885 and a first hole 901 of the dash panel 9. Herein, the bolt 887 is inserted so as not to penetrate through the dash panel 9.

The second mounting portion 882 is connected to the housing tubular portion 884 described later, and extends downward from the housing tubular portion 884. The second mounting portion 882 includes a second mounting hole 886. The second mounting portion 882 is mounted to the dash panel 9 by inserting another bolt 887 into the second mounting hole 886 and a second hole 902 of the dash panel 9.

The housing bottom portion 883 supports a part of the lever portion 812 such that the lever portion 812 is rotatable about the rotation axis O. The housing bottom portion 883 also supports the stroke sensor 86.

The housing tubular portion 884 has a tubular shape, is connected to the housing bottom portion 883, and extends downward from the housing bottom portion 883. The housing tubular portion 884 houses a part of the lever portion 812.

The reaction force generation portion 90 is connected to the housing tubular portion 884 and the lever portion 812, and generates a reaction force Fr applied on the lever portion 812 in accordance with the stroke amount X. Specifically, the reaction force generation portion 90 includes an elastic member 91.

Figure 7:
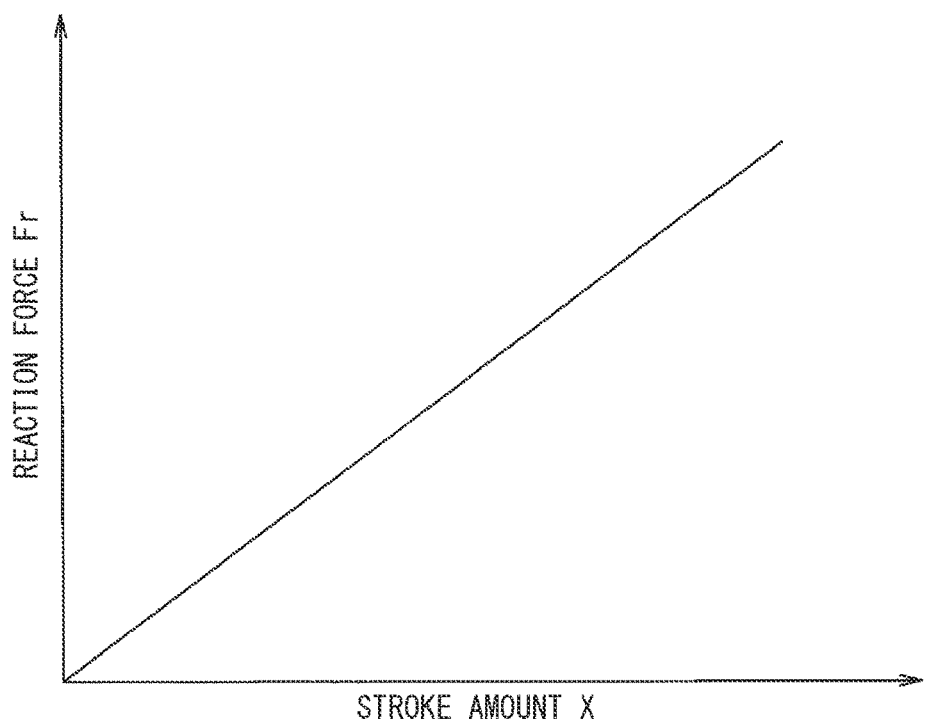
FIG. 7 is a diagram illustrating a relationship between the stroke amount and reaction force.

The elastic member 91 is, for example, a helical compression spring. The elastic member 91 is connected to an inner front side of the housing tubular portion 884 and the lever portion 812. Thus, when the brake pedal 81 is operated by the pedal force of the driver of the vehicle 6, a force that corresponds to the pedal force is transmitted from the lever portion 812 to the elastic member 91. As a result, the elastic member 91 is elastically deformed, that is, contracts herein, and thus a restoration force is generated. This restoration force generates the reaction force Fr applied on the lever portion 812. The restoration force of the elastic member 91 is proportional to a deformation amount of the elastic member 91. The deformation amount of the elastic member 91 is proportional to the stroke amount X. Thus, the restoration force of the elastic member 91 is proportional to the stroke amount X. Therefore, as illustrated in FIG. 7, the stroke amount X and the reaction force Fr have a linear relationship. Herein, the rotation angle θ described above is also adjusted to have a linear relationship with the reaction force Fr.

The vehicle brake system 1 is configured as described above. The left front wheel FL, the right front wheel FR, the left rear wheel RL, and the right rear wheel RR of the vehicle 6 are controlled by processing of the control calculation section 633 of the ECU 53 in the vehicle brake system 1.

Next, the processing of the control calculation section 633 will be described with reference to a flowchart of FIG. 8. Here, for example, when an ignition of the vehicle 6 is turned on, the control calculation section 633 executes the programs stored in the ROM of the storage section 632. In an initial state, the first power supply 401 is set as the power supply source that supplies power to the ECU 53.

In step S100, the control calculation section 633 obtains various information. Specifically, the control calculation section 633 obtains a first voltage Vb1, which is the voltage applied from the first power supply 401 to the ECU 53, from the first voltage sensor 451 through the communication section 631. The control calculation section 633 also obtains the hydraulic pressure of the brake fluid flowing from the first actuator 10 to the second actuator 20, from the first pressure sensor 14 through the communication section 631. The control calculation section 633 further obtains the brake hydraulic pressure on the downstream side of the first differential pressure control valve 212 from the second pressure sensor 213 through the communication section 631. The control calculation section 633 also obtains the brake hydraulic pressure on the downstream side of the second differential pressure control valve 262 from the third pressure sensor 263 through the communication section 631. The control calculation section 633 further obtains the sensor output Vs that corresponds to the stroke amount X of the brake pedal 81 from the stroke sensor 86 through the communication section 631. The control calculation section 633 also obtains a yaw rate, which is a rate of change in rotation angle of the vehicle 6 in the turning direction, from a yaw rate sensor (not illustrated) through the communication section 631. The control calculation section 633 further obtains acceleration of the vehicle 6 from an acceleration sensor (not illustrated) through the communication section 631. The control calculation section 633 also obtains a steering angle of the vehicle 6 from a steering angle sensor (not illustrated) through the communication section 631. The control calculation section 633 further obtains wheel speeds of the left front wheel FL, the right front wheel FR, the left rear wheel RL, and the right rear wheel RR from wheel speed sensors (not illustrated) through the communication section 631. The control calculation section 633 also obtains a vehicle speed of the vehicle 6 from a vehicle speed sensor (not illustrated) through the communication section 631. Herein, the vehicle speed is abbreviation of the estimated vehicle body speed.

Figure 9:
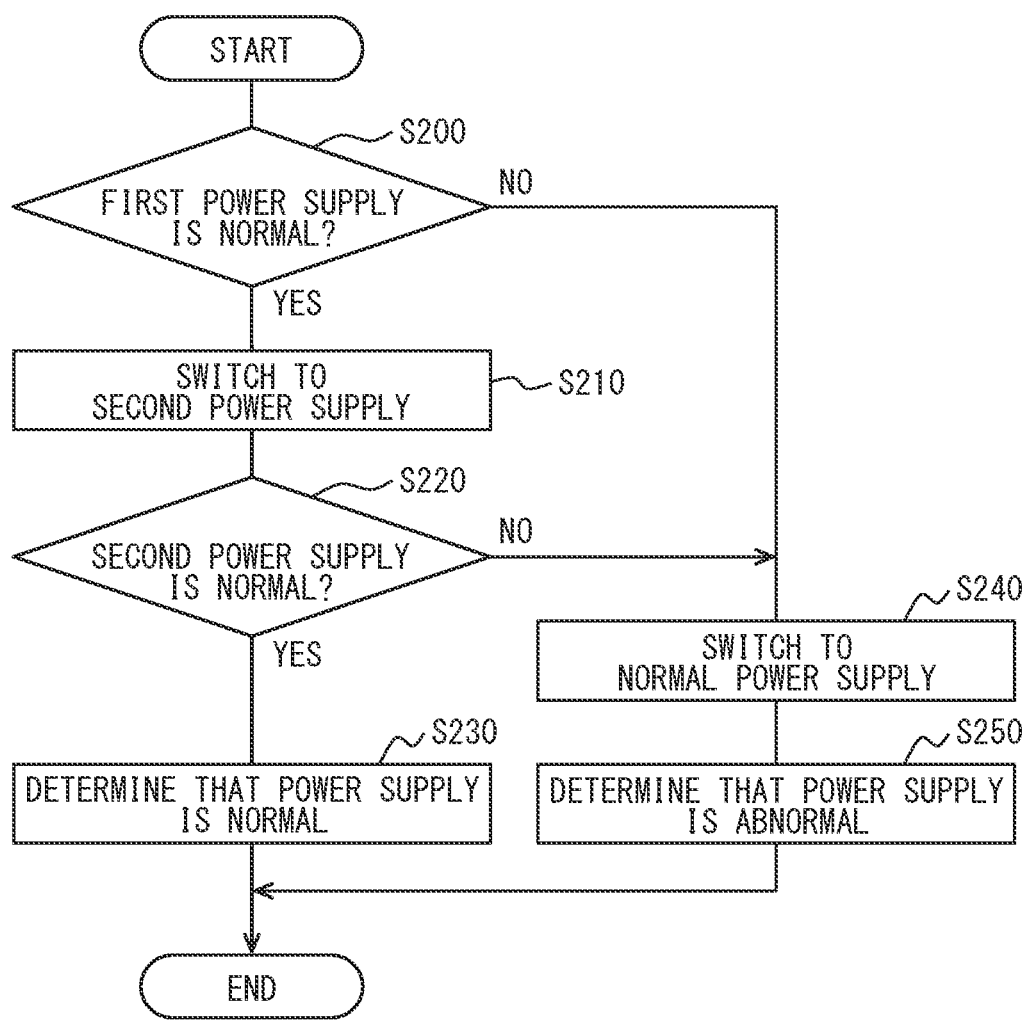
FIG. 9 is a sub flowchart illustrating processing executed by the control calculation section.

In step S110, the control calculation section 633 determines whether the first power supply 401 and the second power supply 402 are normal. Here, this determination will be described with reference to a flowchart of FIG. 9.

In step S200, the control calculation section 633 determines whether the first power supply 401 is normal. Specifically, the control calculation section 633 determines whether the first voltage Vb1 obtained in step S100 is equal to or higher than a first voltage threshold Vb_th1 and equal to or lower than a second voltage threshold Vb_th2. When the first voltage Vb1 is equal to or higher than the first voltage threshold Vb_th1 and equal to or lower than the second voltage threshold Vb_th2, the first power supply 401 is normal. Thus, the processing proceeds to step S210. When the first voltage Vb1 is lower than the first voltage threshold Vb_th1, the first power supply 401 is abnormal. Thus, the processing proceeds to step S240. When the first voltage Vb1 is higher than the second voltage threshold Vb_th2, the first power supply 401 is abnormal. Thus, the processing proceeds to step S240. The first voltage threshold Vb_th1 and the second voltage threshold Vb_th2 are set through experiments, simulations, or the like.

In step S210 subsequent to step S200, the control calculation section 633 outputs, to the power supply switching circuit 403, the signal for setting the second power supply 402 as the power supply source that supplies power to the ECU 53. With this output, the power supply switching circuit 403 switches the power supply source that supplies power to the ECU 53 from the first power supply 401 to the second power supply 402.

Subsequently, in step S220, the control calculation section 633 obtains a second voltage Vb2, which is the voltage applied from the second power supply 402 to the ECU 53, from the second voltage sensor 452 through the communication section 631. The control calculation section 633 determines whether the obtained second voltage Vb2 is equal to or higher than the first voltage threshold Vb_th1 and equal to or lower than the second voltage threshold Vb_th2. When the second voltage Vb2 is equal to or higher than the first voltage threshold Vb_th1 and equal to or lower than the second voltage threshold Vb_th2, the second power supply 402 is normal. Thus, the processing proceeds to step S230. When the second voltage Vb2 is lower than the first voltage threshold Vb_th1, the second power supply 402 is abnormal. Thus, the processing proceeds to step S240. When the second voltage Vb2 is higher than the second voltage threshold Vb_th2, the second power supply 402 is abnormal. Thus, the processing proceeds to step S240.

In step S230 subsequent to step S220, since both of the first power supply 401 and the second power supply 402 are normal, the control calculation section 633 sets a power supply normality flag to ON, for example. Then, the processing proceeds to step S120.

In step S240, the first power supply 401 or the second power supply 402 is abnormal, and thus the control calculation section 633 determines which of the first power supply 401 or the second power supply 402 is normal. The control calculation section 633 outputs, to the power supply switching circuit 403, the signal for switching the power supply source that supplies power to the ECU 53 to the normal one. With this output, the power supply switching circuit 403 switches the power supply source that supplies power to the ECU 53 to the one of the first power supply 401 or the second power supply 402, which is normal. Then, the processing proceeds to step S250. When both of the first power supply 401 and the second power supply 402 are abnormal, the processing proceeds to step S250.

In step S250 subsequent to step S240, since the first power supply 401 or the second power supply 402 is abnormal, the control calculation section 633 sets a power supply abnormality flag to ON, for example. Then, the processing proceeds to step S190.

In this manner, the control calculation section 633 determines whether the first power supply 401 and the second power supply 402 are normal. Then, when the first power supply 401 and the second power supply 402 are normal, the processing proceeds to step S120. When the first power supply 401 or the second power supply 402 is abnormal, the processing proceeds to step S190.

Figure 8:
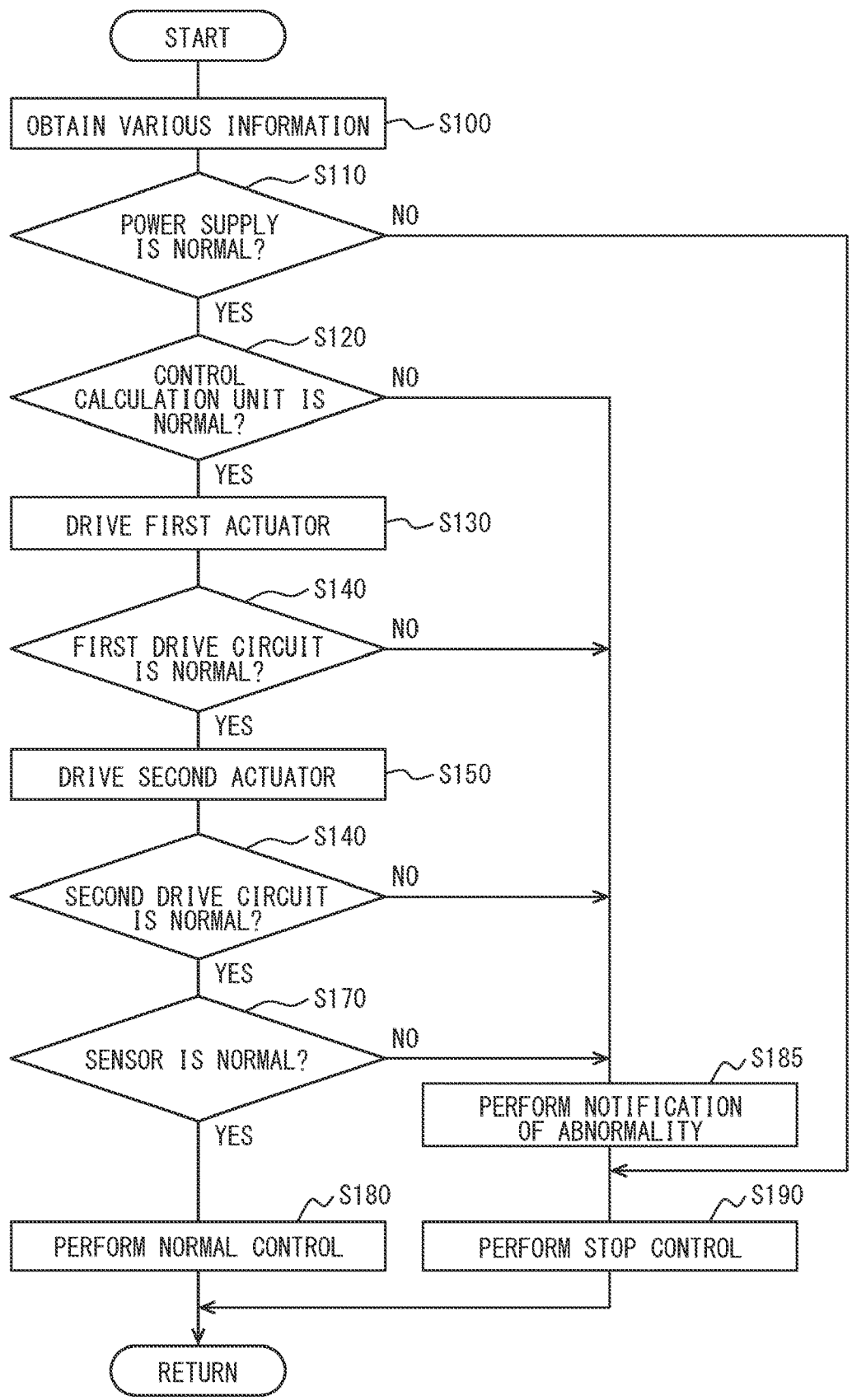
FIG. 8 is a flowchart illustrating processing executed by a control calculation section.

In step S120 subsequent to step S110, as illustrated in FIG. 8, the control calculation section 633 determines whether the control calculation section 633 itself is normal. For example, the control calculation section 633 periodically outputs a watchdog signal to a monitoring integrated circuit (IC) (not illustrated). The monitoring IC determines whether the monitoring IC has detected the watchdog signal from the control calculation section 633. Then, when the monitoring IC has detected the watchdog signal from the control calculation section 633, the monitoring IC determines that the control calculation section 633 is normal while the monitoring IC outputs a low-level signal to the control calculation section 633. When the control calculation section 633 receives the low-level signal from the monitoring IC, the control calculation section 633 is normal. Thus, the processing proceeds to step S130. When the monitoring IC does not detect the watchdog signal from the control calculation section 633, the monitoring IC outputs a signal, which is, for example, a high-level signal, indicating that the control calculation section 633 is abnormal to the control calculation section 633. When the control calculation section 633 receives the high-level signal from the monitoring IC, the control calculation section 633 is abnormal. Thus, the processing proceeds to step S185.

In step S130 subsequent to step S120, the control calculation section 633 drives the first actuator 10. Specifically, the control calculation section 633 outputs the signal for driving the first actuator 10 to the first drive circuit 71. The first drive circuit 71 drives the first actuator motor 13 based on the signal from the control calculation section 633. The first actuator motor 13 rotates based on the signal from the first drive circuit 71 to drive the first pump 12. With this driving, the first pump 12 increases the pressure of the brake fluid from the reservoir 11. The brake fluid with the increased hydraulic pressure flows from the first actuator 10 to the second actuator 20.

Subsequently, in step S140, the control calculation section 633 determines whether the first drive circuit 71 is normal. Specifically, the control calculation section 633 obtains a first hydraulic pressure P1 from the first pressure sensor 14 through the communication section 631. The first hydraulic pressure P1 is the hydraulic pressure of the brake fluid having flowed from the first actuator 10 to the second actuator 20 in step S130. Then, the control calculation section 633 determines whether the first hydraulic pressure P1 is equal to or higher than a first hydraulic pressure threshold P1_th. When the first hydraulic pressure P1 is equal to or higher than the first hydraulic pressure threshold P1_th, the first actuator 10 is driven normally by the first drive circuit 71. Thus, the first drive circuit 71 is normal. Therefore, at this time, the processing proceeds to step S150. When the first hydraulic pressure P1 is lower than the first hydraulic pressure threshold P1_th, the first actuator 10 is not driven normally by the first drive circuit 71. Thus, the first drive circuit 71 is abnormal. Therefore, at this time, the processing proceeds to step S185. The first hydraulic pressure threshold P1_th is set through experiments, simulations, or the like. Alternatively, when the first hydraulic pressure P1 is lower than the first hydraulic pressure threshold P1_th, the first actuator 10 may be determined to be abnormal.

In step S150 subsequent to step S140, the control calculation section 633 drives the second actuator 20. Specifically, the control calculation section 633 outputs the signal for driving the second actuator 20 to the second drive circuit 72. The second drive circuit 72 drives the second actuator motor 30 based on the signal from the control calculation section 633. The second actuator motor 30 rotates based on the signal from the second drive circuit 72 to drive the second pump 224 and the third pump 274.

At this time, the second pump 224 sucks the brake fluid stored in the first pressure adjustment reservoir 221. The sucked brake fluid flows between the first differential pressure control valve 212 and each of the first pressure increase control valve 215 and the second pressure increase control valve 218 after the brake fluid flows through the first return-flow pipe line 223. As a result, a pressure of the brake fluid flowing between the first differential pressure control valve 212 and each of the first pressure increase control valve 215 and the second pressure increase control valve 218 is increased.

At this time, the third pump 274 sucks a brake fluid stored in the second pressure adjustment reservoir 271. The sucked brake fluid flows between the second differential pressure control valve 262 and each of the third pressure increase control valve 265 and the fourth pressure increase control valve 268 after the brake fluid flows through the second return-flow pipe line 273. As a result, a pressure of the brake fluid flowing between the second differential pressure control valve 262 and each of the third pressure increase control valve 265 and the fourth pressure increase control valve 268 is increased.

Subsequently, in step S160, the control calculation section 633 determines whether the second drive circuit 72 is normal. Specifically, the control calculation section 633 obtains a second hydraulic pressure P2 from the second pressure sensor 213 through the communication section 631. The second hydraulic pressure P2 is the pressure of the brake fluid flowing between the first differential pressure control valve 212 and each of the first pressure increase control valve 215 and the second pressure increase control valve 218 in step S150. The control calculation section 633 also obtains a third hydraulic pressure P3 from the third pressure sensor 263 through the communication section 631. The third hydraulic pressure P3 is the pressure of the brake fluid flowing between the second differential pressure control valve 262 and each of the third pressure increase control valve 265 and the fourth pressure increase control valve 268 in step S150.

Then, the control calculation section 633 determines whether the second hydraulic pressure P2 is equal to or higher than a second hydraulic pressure threshold P2_th and the third hydraulic pressure P3 is equal to or higher than a third hydraulic pressure threshold P3_th. When the second hydraulic pressure P2 is equal to or higher than the second hydraulic pressure threshold P2_th and the third hydraulic pressure P3 is equal to or higher than the third hydraulic pressure threshold P3_th, the second actuator 20 is driven normally by the second drive circuit 72. Thus, the second drive circuit 72 is normal. Therefore, at this time, the processing proceeds to step S170. When the second hydraulic pressure P2 is lower than the second hydraulic pressure threshold P2_th or the third hydraulic pressure P3 is lower than the third hydraulic pressure threshold P3_th, the second actuator 20 is not driven normally by the second drive circuit 72. Thus, the second drive circuit 72 is abnormal. Therefore, at this time, the processing proceeds to step S185. The second hydraulic pressure threshold P2_th and the third hydraulic pressure threshold P3_th are set through experiments, simulations, or the like. Alternatively, when the second hydraulic pressure P2 is lower than the second hydraulic pressure threshold P2_th or the third hydraulic pressure P3 is lower than the third hydraulic pressure threshold P3_th, the second actuator 20 may be determined to be abnormal.

In step S170 subsequent to step S160, the control calculation section 633 determines whether the stroke sensor 86 is normal. Specifically, the control calculation section 633 determines whether the sensor output Vs obtained in step S100 is equal to or higher than a first sensor threshold Vs_th1 and equal to or lower than a second sensor threshold Vs_th2. When the sensor output Vs is equal to or higher than the first sensor threshold Vs_th1 and equal to or lower than the second sensor threshold Vs_th2, the stroke sensor 86 is normal. Thus, the processing proceeds to step S180. When the sensor output Vs is lower than the first sensor threshold Vs_th1, the stroke sensor 86 is abnormal. Thus, the processing proceeds to step S185. When the sensor output Vs is higher than the second sensor threshold Vs_th2, the stroke sensor 86 is abnormal. Thus, the processing proceeds to step S185. The first sensor threshold Vs_th1 is set based on, for example, an initial position of the brake pedal 81 and a variation in position of the brake pedal 81. The second sensor threshold Vs_th2 is set based on, for example, the maximum value of the stroke amount X of the brake pedal 81 and a variation in position of the brake pedal 81.

In step S180, the control calculation section 633 performs normal control of the first actuator 10 based on the sensor output Vs that corresponds to the stroke amount X, obtained in step S100.

Figure 10:
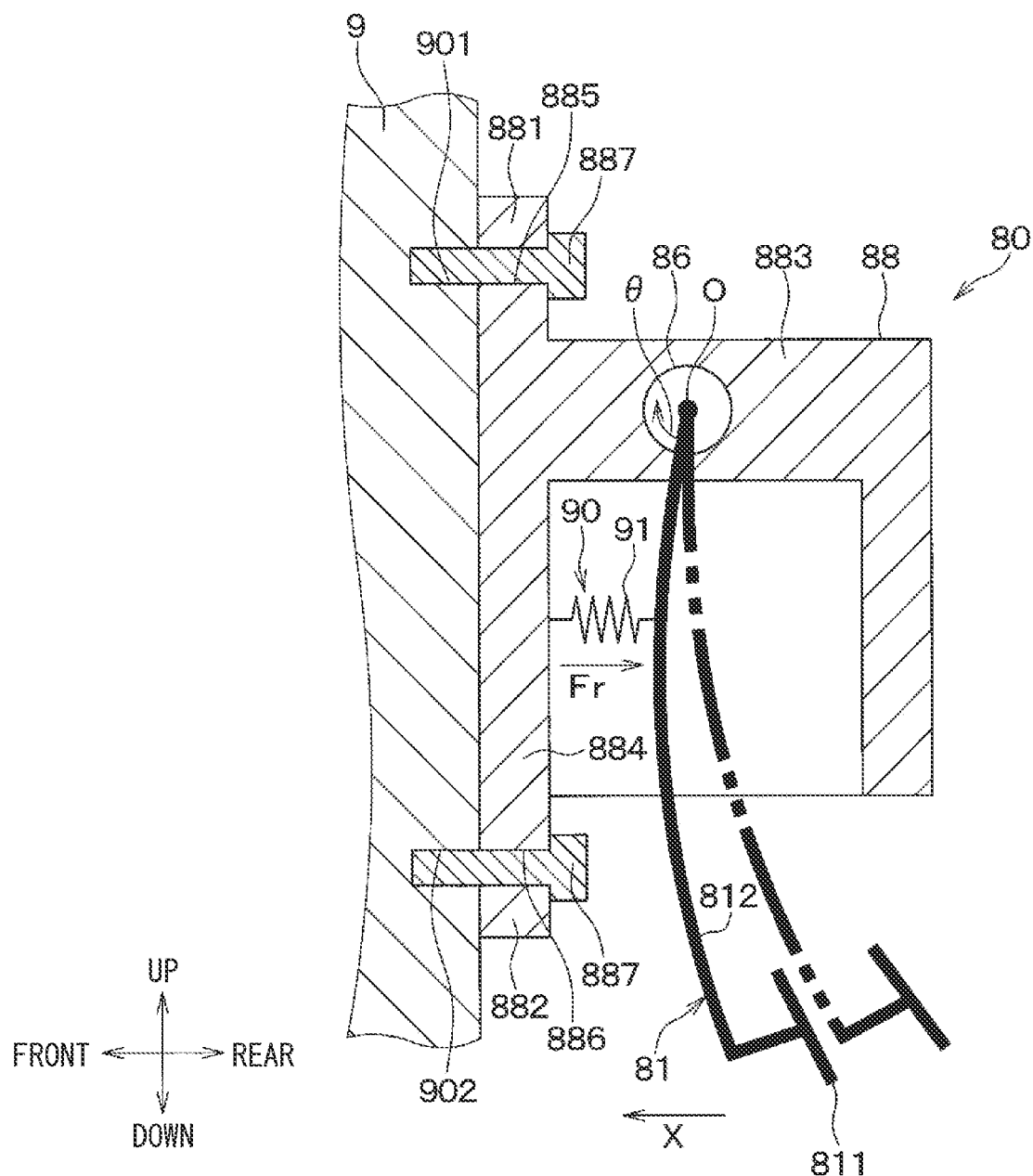
FIG. 10 is a cross-sectional view of the vehicle brake device when a brake pedal is pressed.

For example, as illustrated in FIG. 10, when the pedal portion 811 is pressed by the driver of the vehicle 6, the lever portion 812 rotates about the rotation axis O. With this rotation, the stroke amount X increases, and thus the sensor output Vs increases. At this time, the control calculation section 633 outputs, to the first drive circuit 71, the signal for driving the first actuator 10 to increase the first hydraulic pressure P1 in order to decelerate the vehicle 6. The first drive circuit 71 drives the first actuator motor 13 based on the signal from the control calculation section 633. At this time, a rotation speed of the first actuator motor 13 increases. With this increase in the rotation speed, the first pump 12 increases the pressure of the brake fluid from the reservoir 11. Therefore, the first hydraulic pressure P1 increases. The brake fluid that is relatively high in the first hydraulic pressure P1 flows from the first actuator 10 to the second actuator 20.

When the stroke amount X increases, the elastic member 91 contracts because the elastic member 91 is connected to the inner front side of the housing tubular portion 884 and the lever portion 812. With this contraction, the reaction force Fr is generated along with the restoration force of the elastic member 91. When the driver of the vehicle 6 takes his or her foot off the pedal portion 811, the reaction force Fr causes the brake pedal 81 to return to the initial position. In FIG. 10, the position of the brake pedal 81 in the initial state is indicated by a dashed double-dotted line. Herein, the stroke amount X is the amount of the translational movement of the pedal portion 811 toward the front of the vehicle 6, and thus a direction of the reaction force Fr is a direction toward the rear.

In step S180, the control calculation section 633 performs the normal control, ABS control, VSC control, and the like. The ABS is an abbreviation for Antilock Brake System. The VSC is an abbreviation for Vehicle Stability Control.

For example, when the pedal portion 811 is pressed by the driver of the vehicle 6, the control calculation section 633 performs the normal control, which is brake control made by the driver of the vehicle 6 operating the brake pedal 81. At this time, the lever portion 812 rotates about the rotation axis O. With this rotation, the stroke amount X increases, and thus the sensor output Vs increases. At this time, the control calculation section 633 controls the second drive circuit 72 in order to decelerate the vehicle 6. With this control, the second drive circuit 72 brings the pressure increase control valves in the second actuator 20 into the communicating state by bringing the solenoid coils of the pressure increase control valves in the second actuator 20 into the non-energized state. Therefore, the brake fluid having flowed from the first actuator 10 to the second actuator 20 flows to each of the left front wheel W/C 2, the right front wheel W/C 3, the left rear wheel W/C 4, and the right rear wheel W/C 5, through each corresponding pressure increase control valve. Thus, each brake pad (not illustrated) comes into frictional contact with the corresponding brake disc. Therefore, each wheel that corresponds to each brake disc is decelerated, and thus the vehicle 6 decelerates. As a result, the vehicle 6 stops.

The control calculation section 633 calculates a slip ratio of each of the left front wheel FL, the right front wheel FR, the left rear wheel RL, and the right rear wheel RR, based on, for example, each of the wheel speeds and the vehicle speed obtained in step S100. Then, the control calculation section 633 determines whether to perform the ABS control based on the slip ratios. When the ABS control is performed, the control calculation section 633 performs any of a pressure reducing mode, a maintaining mode, and a pressure increasing mode in accordance with the slip ratios. In the pressure reducing mode, the pressure increase control valve that corresponds to the control target wheel is brought into the blocking state while the pressure reduction control valve is appropriately brought into the communicating state. Thus, the pressure is reduced in the W/C that corresponds to the control target wheel. In the maintaining mode, the pressure increase control valve and the pressure reduction control valve that correspond to the control target wheel are brought into the blocking states. Thus, the pressure is maintained in the W/C that corresponds to the control target wheel. In the pressure increasing mode, the pressure reduction control valve that corresponds to the control target wheel is brought into the blocking state while the pressure increase control valve is appropriately brought into the communicating state. Thus, the pressure is increased in the W/C that corresponds to the control target wheel. The slip ratio of each wheel of the vehicle 6 is controlled in this manner. Thus, the left front wheel FL, the right front wheel FR, the left rear wheel RL, and the right rear wheel RR are prevented from being locked.

The control calculation section 633 also calculates a skid state of the vehicle 6 based on, for example, the yaw rate, the steering angle, the acceleration, each of the wheel speeds, the vehicle speed, and the like obtained in step S100. Then, the control calculation section 633 determines whether to perform the VSC control based on the skid state of the vehicle 6. When the VSC control is performed, the control calculation section 633 selects a control target wheel that is used for stabilizing turning of the vehicle 6, based on the skid state of the vehicle 6. The control calculation section 633 controls the second drive circuit 72 such that the pressure is increased in the W/C that corresponds to the selected control target wheel. At this time, the second drive circuit 72 drives the pump that corresponds to the control target wheel by driving the second actuator motor 30. With this driving, the pump that corresponds to the control target wheel sucks the brake fluid stored in the pressure adjustment reservoir that corresponds to the control target wheel. This sucked brake fluid flows to the W/C that corresponds to the control target wheel after the brake fluid flows through the return-flow pipe line that corresponds to the control target wheel. As a result, the brake hydraulic pressure is increased in the W/C that corresponds to the control target wheel. Thus, the skid of the vehicle 6 is suppressed. Therefore, traveling of the vehicle 6 is stabilized.

In this manner, in step S180, the control calculation section 633 performs the normal control, the ABS control, the VSC control, and the like. Then, the processing returns to step S100. In step S180, in addition to the normal control, the ABS control, and the VSC control as described above, the control calculation section 633 may perform collision avoidance control, regeneration cooperative control, and the like based on signals from another ECU (not illustrated).

In step S185, when the control calculation section 633 itself is abnormal, the control calculation section 633 outputs a signal indicating that the control calculation section 633 is abnormal to a notification device (not illustrated). When the notification device has received this signal, the notification device notifies the driver of the vehicle 6 that the control calculation section 633 is abnormal through screen display, sound, light, and the like.

When the first drive circuit 71 is abnormal, the control calculation section 633 outputs a signal indicating that the first drive circuit 71 is abnormal to the notification device (not illustrated). When the notification device has received this signal, the notification device notifies the driver of the vehicle 6 that the first drive circuit 71 is abnormal through screen display, sound, light, and the like.

When the second drive circuit 72 is abnormal, the control calculation section 633 outputs a signal indicating that the second drive circuit 72 is abnormal to the notification device (not illustrated). When the notification device has received this signal, the notification device notifies the driver of the vehicle 6 that the second drive circuit 72 is abnormal through screen display, sound, light, and the like.

When the stroke sensor 86 is abnormal, the control calculation section 633 outputs a signal indicating that the stroke sensor 86 is abnormal to the notification device (not illustrated). When the notification device has received this signal, the notification device notifies the driver of the vehicle 6 that the stroke sensor 86 is abnormal through screen display, sound, light, and the like. After step S185, the processing proceeds to step S190.

In step S190, when the first power supply 401 and the second power supply 402 are abnormal, the control calculation section 633 cannot control the first drive circuit 71 and the second drive circuit 72 normally. When the control calculation section 633 itself is abnormal, the control calculation section 633 cannot control the first drive circuit 71 and the second drive circuit 72 normally. Therefore, the vehicle 6 is controlled to decelerate and stop in order to ensure safety of the vehicle 6 by another calculation section or the like that is different from the control calculation section 633. For example, in these cases, a regenerative brake (not illustrated), a parking brake (not illustrated), and the like are controlled by another ECU that is different from the ECU 53. As a result, the vehicle 6 safely decelerates and stops.

When the first power supply 401, the second power supply 402, and the control calculation section 633 are normal, even if one of the first drive circuit 71 or the second drive circuit 72 fails, the control calculation section 633 can control the normal one. Thus, the control calculation section 633 controls either the first drive circuit 71 or second drive circuit 72, which is normal, to cause the vehicle 6 to decelerate and stop.

For example, when the first power supply 401, the second power supply 402, the control calculation section 633, and the first drive circuit 71 are normal while the second drive circuit 72 is abnormal, the control calculation section 633 causes the vehicle 6 to decelerate and stop. Specifically, the control calculation section 633 outputs the signal for driving the first actuator 10 to the first drive circuit 71. The first drive circuit 71 drives the first actuator motor 13 based on the signal from the control calculation section 633. The first actuator motor 13 rotates based on the signal from the first drive circuit 71 to drive the first pump 12. The first pump 12 increases the pressure of the brake fluid from the reservoir 11. The brake fluid with the increased hydraulic pressure flows to the second actuator 20. The brake fluid having flowed to the second actuator 20 flows to each of the left front wheel W/C 2, the right front wheel W/C 3, the left rear wheel W/C 4, and the right rear wheel W/C 5, through each corresponding pressure increase control valve. With this flow, each brake pad (not illustrated) comes into frictional contact with the corresponding brake disc. Therefore, each wheel that corresponds to each brake disc is decelerated, and thus the vehicle 6 decelerates. As a result, the vehicle 6 stops.

For example, when the first power supply 401, the second power supply 402, the control calculation section 633, and the second drive circuit 72 are normal while the first drive circuit 71 is abnormal, the control calculation section 633 causes the vehicle 6 to decelerate and stop. Specifically, the control calculation section 633 outputs the signal for driving the second actuator 20 to the second drive circuit 72. The second drive circuit 72 drives the second actuator motor 30 based on the signal from the second control calculation section 623. The second actuator motor 30 rotates based on the signal from the second drive circuit 72 to drive the second pump 224 and the third pump 274.

At this time, the second pump 224 sucks the brake fluid stored in the first pressure adjustment reservoir 221. The sucked brake fluid flows between the first differential pressure control valve 212 and each of the first pressure increase control valve 215 and the second pressure increase control valve 218 after the brake fluid flows through the first return-flow pipe line 223. The brake fluid caused to flow by the second pump 224 flows to the left front wheel W/C 2 through the first pressure increase control valve 215. The brake fluid caused to flow by the second pump 224 flows to the right front wheel W/C 3 through the second pressure increase control valve 218.

At this time, the third pump 274 sucks the brake fluid stored in the second pressure adjustment reservoir 271. The sucked brake fluid flows between the second differential pressure control valve 262 and each of the third pressure increase control valve 265 and the fourth pressure increase control valve 268 after the brake fluid flows through the second return-flow pipe line 273. The brake fluid caused to flow by the third pump 274 flows to the right rear wheel W/C 5 through the third pressure increase control valve 265. The brake fluid caused to flow by the third pump 274 flows to the left rear wheel W/C 4 through the fourth pressure increase control valve 268.

Thus, each brake pad (not illustrated) comes into frictional contact with the corresponding brake disc. Therefore, each wheel that corresponds to each brake disc is decelerated, and thus the vehicle 6 decelerates. As a result, the vehicle 6 stops. After step S190, the processing returns to step S100.

In this manner, the processing of the control calculation section 633 is executed.

In the vehicle brake system 1, the brake of the vehicle 6 is controlled as described above. In the vehicle brake system 1, redundancy is improved. Hereinafter, the improvement of the redundancy will be described. Herein, the redundancy refers to safety, which is obtained by the vehicle brake system 1 provided with backup devices in preparation for a case where any fault occurs in the vehicle brake system 1.

In the present embodiment, the ECU 53 includes the first drive circuit 71 and the second drive circuit 72. The first drive circuit 71 drives the first actuator 10. The second drive circuit 72 drives the second actuator 20. With this configuration, even if one of the first drive circuit 71 or the second drive circuit 72 fails, the vehicle brake system 1 can cause the vehicle 6 to decelerate and stop safely by using the other normal one. Therefore, the redundancy of the vehicle brake system 1 can be ensured, and thus the redundancy of the vehicle brake system 1 is improved.

The vehicle brake system 1 also has effects as described below.

[1] The vehicle brake system 1 includes the first power supply 401 and the second power supply 402. With this configuration, even if one of the first power supply 401 or the second power supply 402 fails, power can be ensured by using the other normal one. Thus, the vehicle brake system 1 can cause the vehicle 6 to decelerate and stop safely. Therefore, the redundancy of the vehicle brake system 1 can be ensured, and thus the redundancy of the vehicle brake system 1 is improved.

[2] The vehicle brake system 1 includes the first actuator 10 and the second actuator 20. With this configuration, even if one of the first actuator 10 or the second actuator 20 fails, the vehicle brake system 1 can cause the vehicle 6 to decelerate and stop safely by using the other normal one. Therefore, the redundancy of the vehicle brake system 1 can be ensured, and thus the redundancy of the vehicle brake system 1 is improved.

Second Embodiment

In a second embodiment, the ECU 53 of the vehicle brake system 1 includes two microcomputers. The vehicle brake system 1 further includes two voltage sensors. The vehicle brake device 80 includes two stroke sensors. Processing executed by the ECU 53 is different. The others are similar to those of the first embodiment.

Figure 11:
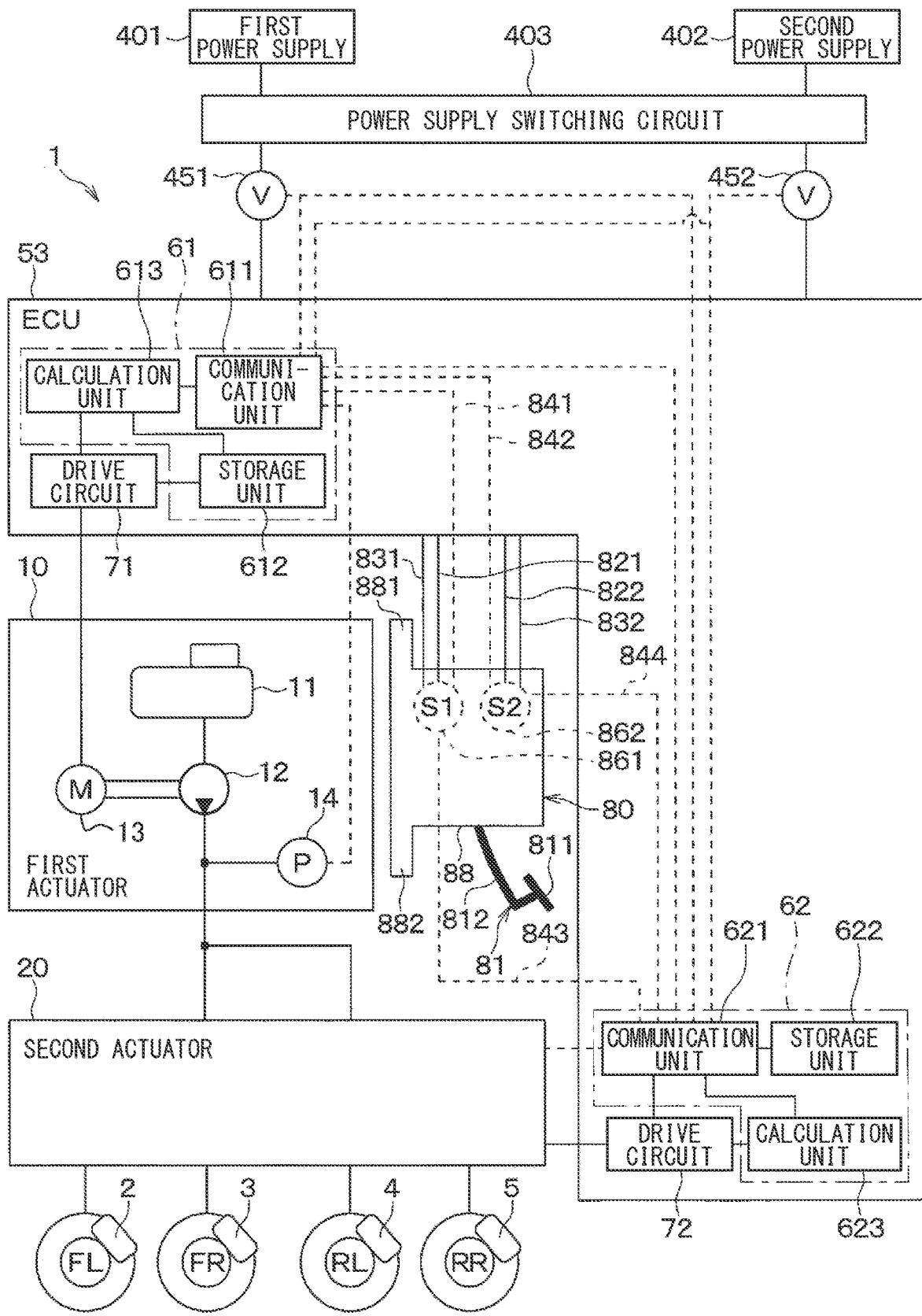
FIG. 11 is a configuration diagram of a vehicle brake system according to a second embodiment.

As illustrated in FIG. 11, the ECU 53 of the vehicle brake system 1 according to the second embodiment includes a first microcomputer 61 and a second microcomputer 62, in addition to the first drive circuit 71 and the second drive circuit 72 described above.

The first microcomputer 61 corresponds to a first hydraulic pressure control unit, and controls the first actuator 10 by controlling the first drive circuit 71. Specifically, the first microcomputer 61 includes a first communication section 611, a first storage section 612, and a first control calculation section 613.

The first communication section 611 includes an interface for communicating with the first pressure sensor 14. The first communication section 611 also includes an interface for communicating with the first voltage sensor 451 and an interface for communicating with the second voltage sensor 452. The first communication section 611 further includes an interface for communicating with the second microcomputer 62 described later. The first communication section 611 also includes an interface for communicating with a first stroke sensor 861 described later and an interface for communicating with a second stroke sensor 862 described later.

The first storage section 612 includes non-volatile memories such as a ROM and a flash memory, and a volatile memory such as a RAM. The non-volatile memories and the volatile memory are non-transitory tangible storage media.

The first control calculation section 613 includes a CPU and the like. The first control calculation section 613 outputs a signal for driving the first actuator motor 13 to the first drive circuit 71 by executing a program stored in the ROM of the first storage section 612.

The second microcomputer 62 corresponds to a second hydraulic pressure control unit, and controls the second actuator 20 by controlling the second drive circuit 72. Specifically, the second microcomputer 62 includes a second communication section 621, a second storage section 622, and a second control calculation section 623.

The second communication section 621 includes an interface for communicating with the second pressure sensor 213 and an interface for communicating with the third pressure sensor 263. The second communication section 621 also includes an interface for communicating with the first voltage sensor 451 and an interface for communicating with the second voltage sensor 452. The second communication section 621 further includes an interface for communicating with the first communication section 611 of the first microcomputer 61. The second communication section 621 also includes an interface for communicating with the first stroke sensor 861 described later and an interface for communicating with the second stroke sensor 862 described later.

The second storage section 622 includes non-volatile memories such as a ROM and a flash memory, and a volatile memory such as a RAM. The non-volatile memories and the volatile memory are non-transitory tangible storage media.

The second control calculation section 623 includes a CPU and the like. The second control calculation section 623 outputs a signal for driving the second actuator motor 30 to the second drive circuit 72 by executing a program stored in the ROM of the second storage section 622.

The vehicle brake device 80 includes the brake pedal 81, the housing 88, and the reaction force generation portion 90, which are similar to those of the first embodiment described above. The vehicle brake device 80 also includes a first sensor power supply line 821, a first sensor ground line 831, a first sensor output line 841, and a second sensor output line 842. The vehicle brake device 80 further includes a second sensor power supply line 822, a second sensor ground line 832, a third sensor output line 843, a fourth sensor output line 844, the first stroke sensor 861, and the second stroke sensor 862.

Figure 12:
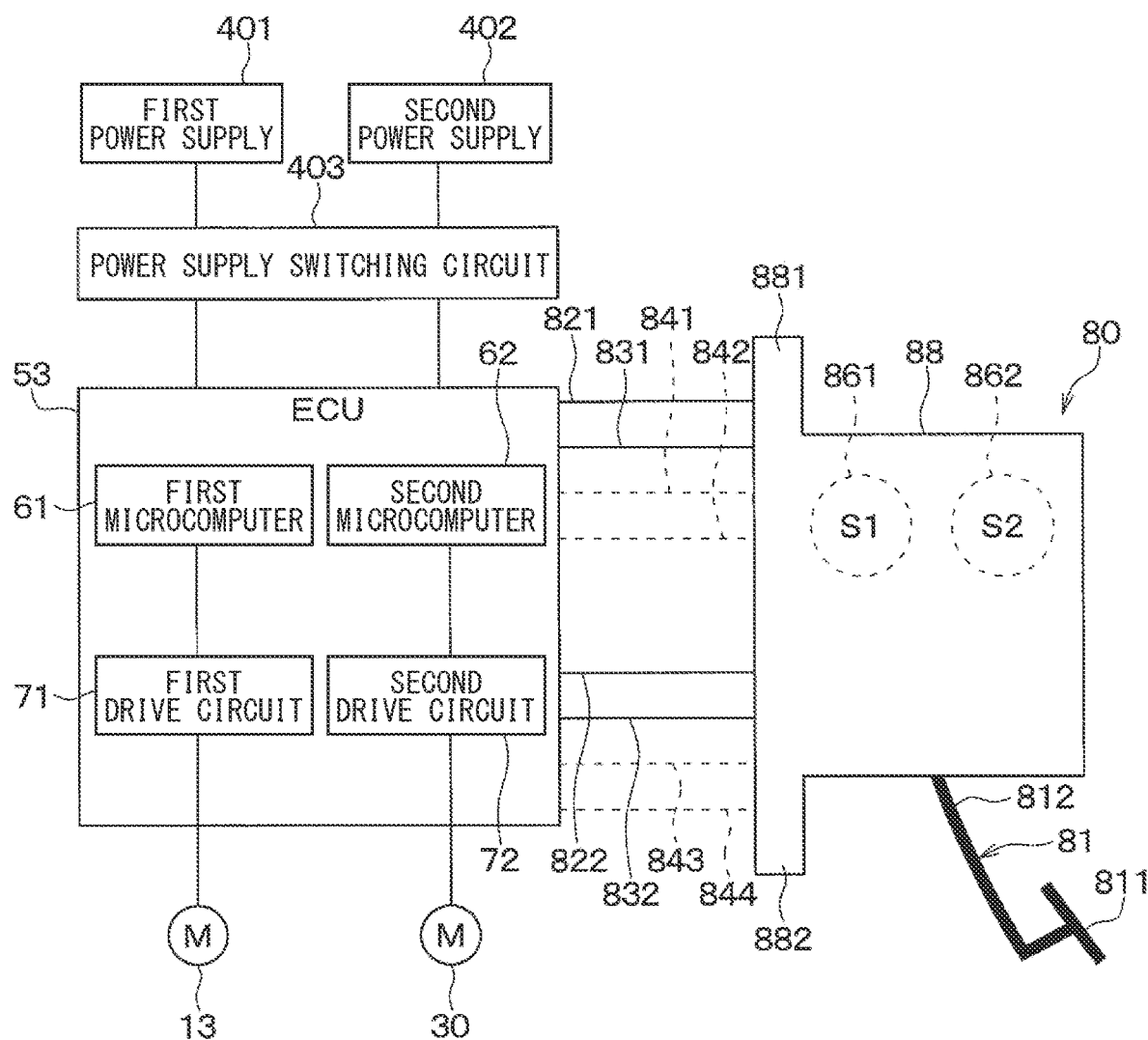
FIG. 12 is a wiring diagram of the vehicle brake system.

As illustrated in FIGS. 11 and 12, the first sensor power supply line 821 is connected to the ECU 53 and the first stroke sensor 861. With this connection, power from the first power supply 401 and the second power supply 402 is supplied to the first stroke sensor 861 through the ECU 53.

The first sensor ground line 831 is connected to the ECU 53 and the first stroke sensor 861.

The first sensor output line 841 is connected to the ECU 53 and the first stroke sensor 861.

The second sensor output line 842 is connected to the ECU 53 and the second stroke sensor 862.

The second sensor power supply line 822 is connected to the ECU 53 and the second stroke sensor 862. With this connection, power from the first power supply 401 and the second power supply 402 is supplied to the second stroke sensor 862 through the ECU 53.

The second sensor ground line 832 is connected to the ECU 53 and the second stroke sensor 862.

The third sensor output line 843 is connected to the ECU 53 and the first stroke sensor 861.

The fourth sensor output line 844 is connected to the ECU 53 and the second stroke sensor 862.

Figure 13:
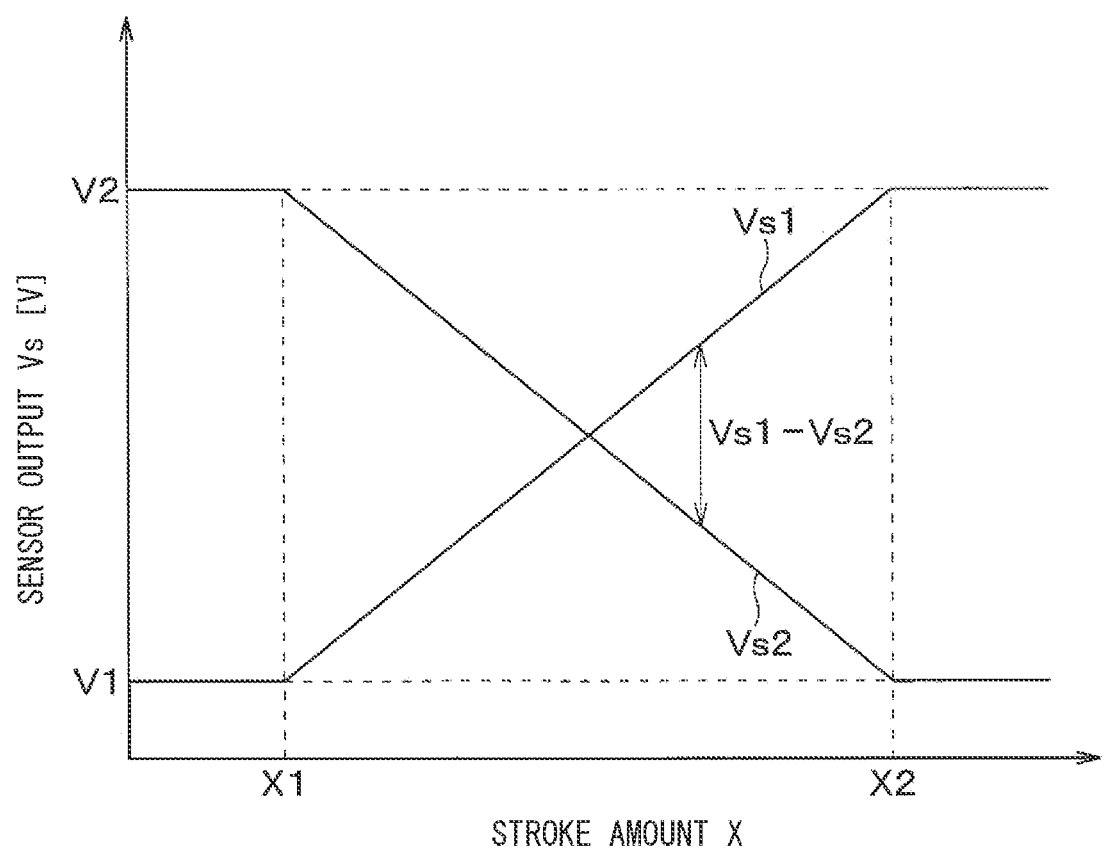
FIG. 13 is a diagram illustrating a relationship between the stroke amount and sensor output.

The first stroke sensor 861 outputs a signal being in accordance with the stroke amount X of the brake pedal 81 to the first microcomputer 61 through the first sensor output line 841. The first stroke sensor 861 also outputs the signal being in accordance with the stroke amount X of the brake pedal 81 to the second microcomputer 62 through the third sensor output line 843. Herein, as illustrated in FIG. 13, a first sensor output Vs1, which is the signal from the first stroke sensor 861, is adjusted to be constant at V1 when the stroke amount X is smaller than X1. The first sensor output Vs1 is adjusted to increase as the stroke amount X increases when the stroke amount X is equal to or larger than X1 and smaller than X2. The first sensor output Vs1 is adjusted to be constant at V2, which is a value higher than V1, when the stroke amount X is equal to or larger than X2. Note that V1 and V2 are set through experiments, simulations, or the like. Herein, V1 is set to a value lower than the first sensor threshold Vs_th1 described above. Further, V2 is set to a value higher than the second sensor threshold Vs_th2 described above.

As illustrated in FIGS. 11 and 12, the second stroke sensor 862 outputs a signal being in accordance with the stroke amount X of the brake pedal 81 to the first microcomputer 61 through the second sensor output line 842. The second stroke sensor 862 also outputs the signal being in accordance with the stroke amount X of the brake pedal 81 to the second microcomputer 62 through the fourth sensor output line 844. Herein, as illustrated in FIG. 13, a second sensor output Vs2, which is the signal from the second stroke sensor 862, is adjusted to be constant at V2, which is the value higher than V1, when the stroke amount X is smaller than X1. The second sensor output Vs2 is adjusted to decrease as the stroke amount X increases when the stroke amount X is equal to or larger than X1 and smaller than X2. The second sensor output Vs2 is adjusted to be constant at V1, which is the value lower than V2, when the stroke amount X is equal to or larger than X2.

The vehicle brake system 1 according to the second embodiment is configured as described above.

Figure 14:
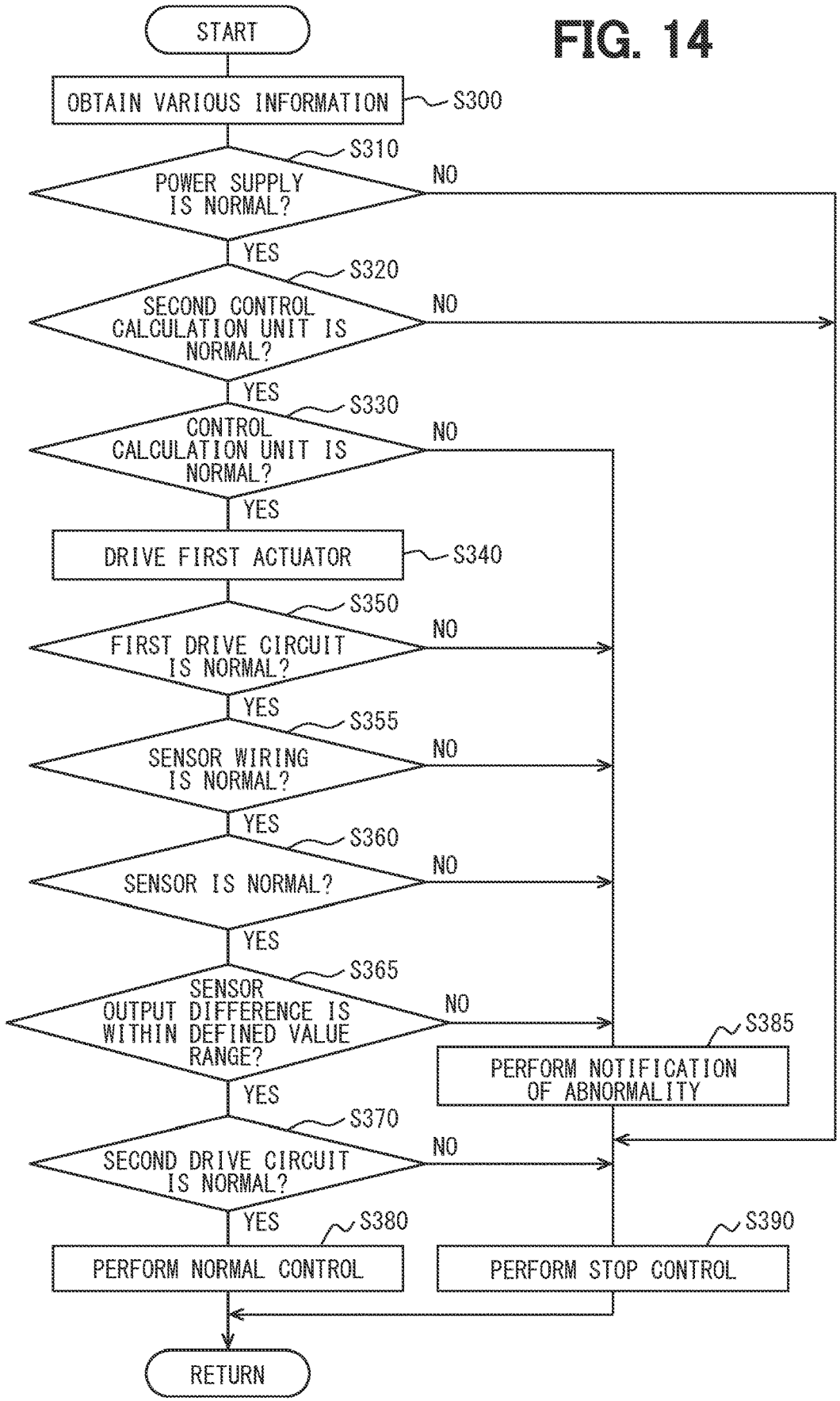
FIG. 14 is a flowchart illustrating processing executed by a first control calculation section.

Next, processing of the first control calculation section 613 will be described with reference to a flowchart of FIG. 14. Here, for example, when the ignition of the vehicle 6 is turned on, the first control calculation section 613 executes programs stored in the ROM of the first storage section 612. As with the above description, in the initial state, the first power supply 401 is set as the power supply source that supplies power to the ECU 53.

In step S300, the first control calculation section 613 obtains various information. Specifically, the first control calculation section 613 obtains the first voltage Vb1, which is the voltage applied from the first power supply 401 to the ECU 53, from the first voltage sensor 451 through the first communication section 611. The first control calculation section 613 also obtains the hydraulic pressure of the brake fluid supplied from the first actuator 10 to the second actuator 20, from the first pressure sensor 14 through the first communication section 611. The first control calculation section 613 further obtains the first sensor output Vs1 that corresponds to the stroke amount X of the brake pedal 81 from the first stroke sensor 861 through the first sensor output line 841 and the first communication section 611. The first control calculation section 613 also obtains the second sensor output Vs2 that corresponds to the stroke amount X of the brake pedal 81 from the second stroke sensor 862 through the second sensor output line 842 and the first communication section 611.

Subsequently, in step S310, the first control calculation section 613 determines whether the first power supply 401 and the second power supply 402 are normal, similarly to step S110 executed by the control calculation section 633, which has been described above. When the first power supply 401 and the second power supply 402 are normal, the processing proceeds to step S320. When the first power supply 401 or the second power supply 402 is abnormal, the processing proceeds to step S390.

In step S320 subsequent to step S310, the first control calculation section 613 determines whether the second control calculation section 623 is normal. Specifically, the first control calculation section 613 determines whether the first control calculation section 613 has received a signal indicating that the second control calculation section 623 is abnormal, which will be described later, from the second control calculation section 623. When the second control calculation section 623 is normal, the processing proceeds to step S330. When the second control calculation section 623 is abnormal, the processing proceeds to step S390.

In step S330 subsequent to step S320, the first control calculation section 613 determines whether the first control calculation section 613 itself is normal by using the watchdog signal and the monitoring IC, similarly to step S120 executed by the control calculation section 633, which has been described above. When the first control calculation section 613 itself is normal, the processing proceeds to step S340. When the first control calculation section 613 itself is abnormal, the processing proceeds to step S385.

In step S340 subsequent to step S330, the first control calculation section 613 drives the first actuator 10, similarly to step S130 executed by the control calculation section 633, which has been described above.

Subsequently, in step S350, the first control calculation section 613 determines whether the first drive circuit 71 is normal based on the first hydraulic pressure P1, similarly to step S140 executed by the control calculation section 633, which has been described above. When the first drive circuit 71 is normal, the processing proceeds to step S355. When the first drive circuit 71 is abnormal, the processing proceeds to step S385. As described above, the first hydraulic pressure P1 is the hydraulic pressure of the brake fluid having flowed from the first actuator 10 to the second actuator 20.

In step S355 subsequent to step S350, the first control calculation section 613 determines whether the first sensor power supply line 821 and the second sensor power supply line 822 are normal. Specifically, the first control calculation section 613 determines whether each of the first sensor output Vs1 and the second sensor output Vs2 obtained in step S300 is equal to or higher than V1 and equal to or lower than V2. As described above, V1 and V2 are set through experiments, simulations, or the like. Herein, as will be described later, V1 is set to a value lower than the first sensor threshold Vs_th1 described above. Further, V2 is set to a value higher than the second sensor threshold Vs_th2 described above.

When the first sensor output Vs1 is equal to or higher than V1 and equal to or lower than V2, the first sensor power supply line 821 is normal. When the second sensor output Vs2 is equal to or higher than V1 and equal to or lower than V2, the second sensor power supply line 822 is normal. Therefore, when each of the first sensor output Vs1 and the second sensor output Vs2 is equal to or higher than V1 and equal to or lower than V2, the first sensor power supply line 821 and the second sensor power supply line 822 are normal. Thus, the processing proceeds to step S360. When the first sensor output Vs1 or the second sensor output Vs2 is lower than V1, the first sensor power supply line 821 or the second sensor power supply line 822 is abnormal. In this case, for example, disconnection is made. Thus, the processing proceeds to step S385. When the first sensor output Vs1 or the second sensor output Vs2 is higher than V2, the first sensor power supply line 821 or the second sensor power supply line 822 is abnormal. In this case, for example, disconnection is made. Thus, the processing proceeds to step S385.

In step S360 subsequent to step S355, the first control calculation section 613 determines whether the first stroke sensor 861 is normal. Specifically, the first control calculation section 613 determines whether the first sensor output Vs1 obtained in step S300 is equal to or higher than the first sensor threshold Vs_th1 and equal to or lower than the second sensor threshold Vs_th2. As described above, the first sensor threshold Vs_th1 is set based on, for example, the initial position of the brake pedal 81 and the variation in position of the brake pedal 81. The second sensor threshold Vs_th2 is set based on, for example, the maximum value of the stroke amount X of the brake pedal 81 and the variation in position of the brake pedal 81. Herein, when the stroke amount X is a value near X1 and is larger than X1, that is, when X>X1, the brake pedal 81 is placed at the initial position. When the stroke amount X is a value near X2 and smaller than X2, that is, when X2>X, the stroke amount X of the brake pedal 81 becomes the maximum value. Therefore, herein, V1, V2, the first sensor threshold Vs_th1, and the second sensor threshold Vs_th2 have a relationship of V1<Vs_th1<Vs_th2<V2.

When the first sensor output Vs1 is equal to or higher than the first sensor threshold Vs_th1 and equal to or lower than the second sensor threshold Vs_th2, the first stroke sensor 861 is normal. Thus, the processing proceeds to step S365. When the first sensor output Vs1 is equal to or higher than V1 and lower than the first sensor threshold Vs_th1, the first stroke sensor 861 is abnormal. Thus, the processing proceeds to step S385. When the first sensor output Vs1 is higher than the second sensor threshold Vs_th2 and equal to or lower than V2, the first stroke sensor 861 is abnormal. Thus, the processing proceeds to step S385. At this time, similarly to the first stroke sensor 861, the first control calculation section 613 may determine whether the second stroke sensor 862 is normal based on the second sensor output Vs2 obtained in step S300.

In step S365 subsequent to step S360, the first control calculation section 613 determines whether the first stroke sensor 861 and the second stroke sensor 862 are normal. Specifically, the first control calculation section 613 calculates a sensor output difference Vs1-Vs2, which is a relative value of a difference between the first sensor output Vs1 and the second sensor output Vs2, based on the first sensor output Vs1 and the second sensor output Vs2 obtained in step S300.

As described above, the first sensor output Vs1 is adjusted to be constant at V1 when the stroke amount X is smaller than X1, as illustrated in FIG. 13. The first sensor output Vs1 is adjusted to increase as the stroke amount X increases when the stroke amount X is equal to or larger than X1 and smaller than X2. The first sensor output Vs1 is constant at V2 when the stroke amount X is equal to or larger than X2.

The second sensor output Vs2 is adjusted to be constant at V2, which is the value higher than V1, when the stroke amount X is smaller than X1. The second sensor output Vs2 is adjusted to decrease as the stroke amount X increases when the stroke amount X is equal to or larger than X1 and smaller than X2. The second sensor output Vs2 is adjusted to be constant at V1, which is the value lower than V2, when the stroke amount X is equal to or larger than X2. Thus, when the first sensor output Vs1 and the second sensor output Vs2 are normal, the sensor output difference Vs1-Vs2 is a value defined by the stroke amount X.

Therefore, the first control calculation section 613 determines whether the calculated sensor output difference Vs1-Vs2 is within the range of the defined value described above. When the sensor output difference Vs1-Vs2 is within the range of the defined value described above, the first sensor output Vs1 and the second sensor output Vs2 are normal. Thus, the processing proceeds to step S370. When the sensor output difference Vs1-Vs2 is outside the range of the defined value described above, the first sensor output Vs1 or the second sensor output Vs2 is abnormal. At this time, the first control calculation section 613 determines which of the first stroke sensor 861 or the second stroke sensor 862 is abnormal. Then, the processing proceeds to step S385.

In step S370 subsequent to step S365, the first control calculation section 613 determines whether the second drive circuit 72 is normal. Specifically, the first control calculation section 613 determines whether the first control calculation section 613 has received a signal indicating that the second drive circuit 72 is abnormal, which will be described later, from the second control calculation section 623. When the second drive circuit 72 is normal, the processing proceeds to step S380. When the second drive circuit 72 is abnormal, the processing proceeds to step S390.

In step S380 subsequent to step S370, the first control calculation section 613 controls the first actuator 10, similarly to step S180 executed by the control calculation section 633, which has been described above. Specifically, the first control calculation section 613 performs the normal control of the first actuator 10 based on the first sensor output Vs1 that corresponds to the stroke amount X and that has been obtained in step S300. At this time, the first control calculation section 613 may perform the normal control of the first actuator 10 based on the second sensor output Vs2 that corresponds to the stroke amount X and that has been obtained in step S300. Then, the processing returns to step S300.

In step S385, when the first control calculation section 613 itself is abnormal, the first control calculation section 613 outputs a signal indicating that the first control calculation section 613 is abnormal to the second control calculation section 623. At this time, the first control calculation section 613 also outputs the signal indicating that the first control calculation section 613 is abnormal to the notification device (not illustrated). When the notification device has received this signal, the notification device notifies the driver of the vehicle 6 that the first control calculation section 613 is abnormal through screen display, sound, light, and the like.

When the first drive circuit 71 is abnormal, the first control calculation section 613 outputs a signal indicating that the first drive circuit 71 is abnormal to the second control calculation section 623. At this time, the first control calculation section 613 outputs the signal indicating that the first drive circuit 71 is abnormal to the notification device (not illustrated). When the notification device has received this signal, the notification device notifies the driver of the vehicle 6 that the first drive circuit 71 is abnormal through screen display, sound, light, and the like.

When the first sensor power supply line 821 is abnormal, the first control calculation section 613 outputs a signal indicating that the first sensor power supply line 821 is abnormal to the notification device (not illustrated). When the notification device has received this signal, the notification device notifies the driver of the vehicle 6 that the first sensor power supply line 821 is abnormal through screen display, sound, light, and the like.

When the second sensor power supply line 822 is abnormal, the first control calculation section 613 outputs a signal indicating that the second sensor power supply line 822 is abnormal to the notification device (not illustrated). When the notification device has received this signal, the notification device notifies the driver of the vehicle 6 that the second sensor power supply line 822 is abnormal through screen display, sound, light, and the like.

When the first stroke sensor 861 is abnormal, the first control calculation section 613 outputs a signal indicating that the first stroke sensor 861 is abnormal to the notification device. When the notification device has received this signal, the notification device notifies the driver of the vehicle 6 that the first stroke sensor 861 is abnormal through screen display, sound, light, and the like.

When the second stroke sensor 862 is abnormal, the first control calculation section 613 outputs a signal indicating that the second stroke sensor 862 is abnormal to the notification device. When the notification device has received this signal, the notification device notifies the driver of the vehicle 6 that the second stroke sensor 862 is abnormal through screen display, sound, light, and the like. After step S385, the processing proceeds to step S390.

Subsequently, in step S390, when the first power supply 401 and the second power supply 402 are abnormal, when the first control calculation section 613 itself is abnormal, or when the first drive circuit 71 is abnormal, the first control calculation section 613 cannot control the first drive circuit 71 normally. Therefore, the vehicle 6 is controlled to decelerate and stop in order to ensure the safety of the vehicle 6 by another calculation section or the like that is different from the first control calculation section 613.

For example, in these cases, when the second control calculation section 623 and the second drive circuit 72 are normal, the second control calculation section 623 controls the second actuator 20 by controlling the second drive circuit 72, as described later. As a result, the vehicle 6 safely decelerates and stops.

In these cases, when the second control calculation section 623 and the second drive circuit 72 are abnormal, the regenerative brake (not illustrated), the parking brake (not illustrated), and the like are controlled by another ECU that is different from the ECU 53. As a result, the vehicle 6 safely decelerates and stops.

For example, when the first power supply 401, the second power supply 402, the first control calculation section 613, and the first drive circuit 71 are normal while the second control calculation section 623 or the second drive circuit 72 is abnormal, the first control calculation section 613 causes the vehicle 6 to decelerate and stop.

Specifically, the first control calculation section 613 outputs the signal for driving the first actuator 10 to the first drive circuit 71. The first drive circuit 71 drives the first actuator motor 13 based on the signal from the first control calculation section 613. The first actuator motor 13 rotates based on the signal from the first drive circuit 71 to drive the first pump 12.

At this time, the first pump 12 increases the pressure of the brake fluid from the reservoir 11. The brake fluid with the increased hydraulic pressure flows to the second actuator 20. The brake fluid having flowed to the second actuator 20 flows to each of the left front wheel W/C 2, the right front wheel W/C 3, the left rear wheel W/C 4, and the right rear wheel W/C 5, through each corresponding pressure increase control valve. With this flow, each brake pad (not illustrated) comes into frictional contact with the corresponding brake disc. Therefore, each wheel that corresponds to each brake disc is decelerated, and thus the vehicle 6 decelerates. As a result, the vehicle 6 stops. After step S390, the processing returns to step S300.

In this manner, the processing of the first control calculation section 613 is executed.

Figure 15:
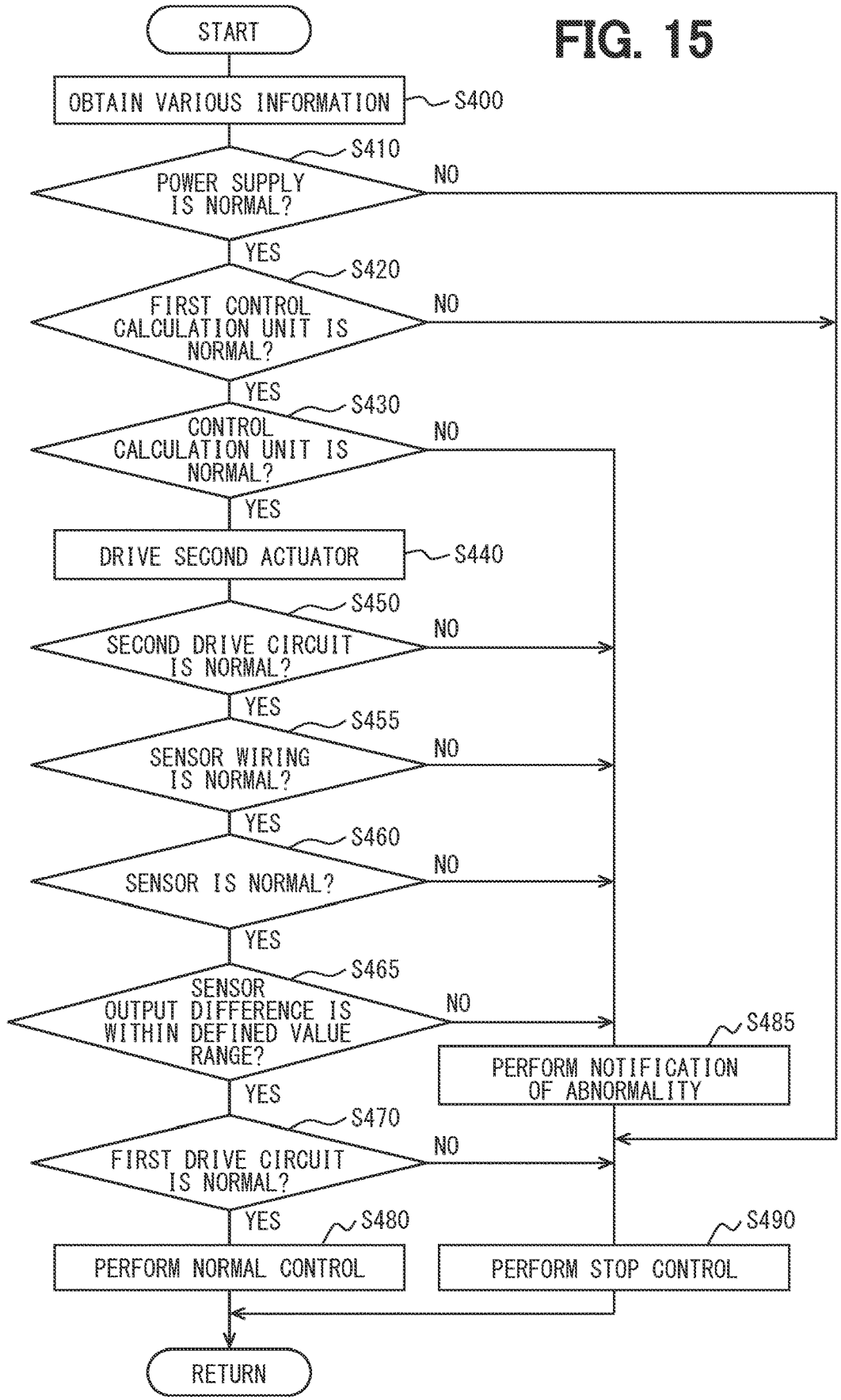
FIG. 15 is a flowchart illustrating processing executed by a second control calculation section.

Next, processing of the second control calculation section 623 will be described with reference to a flowchart of FIG. 15. Here, for example, when the ignition of the vehicle 6 is turned on, the second control calculation section 623 executes programs stored in the ROM of the second storage section 622. As with the above description, in the initial state, the first power supply 401 is set as the power supply source that supplies power to the ECU 53.

In step S400, the second control calculation section 623 obtains various information. Specifically, the second control calculation section 623 obtains the first voltage Vb1, which is the voltage applied from the first power supply 401 to the ECU 53, from the first voltage sensor 451 through the second communication section 621. The second control calculation section 623 also obtains the brake hydraulic pressure on the downstream side of the first differential pressure control valve 212 from the second pressure sensor 213 through the second communication section 621. The second control calculation section 623 further obtains the brake hydraulic pressure on the downstream side of the second differential pressure control valve 262 from the third pressure sensor 263 through the second communication section 621. The second control calculation section 623 also obtains the first sensor output Vs1 that corresponds to the stroke amount X of the brake pedal 81 from the first stroke sensor 861 through the third sensor output line 843 and the second communication section 621. The second control calculation section 623 further obtains the second sensor output Vs2 that corresponds to the stroke amount X of the brake pedal 81 from the second stroke sensor 862 through the fourth sensor output line 844 and the second communication section 621. Similarly to step S100 executed by the control calculation section 633, the second control calculation section 623 obtains the yaw rate, the acceleration, the steering angle, each of the wheel speeds, and the vehicle speed from each sensor (not illustrated) through the second communication section 621.

Subsequently, in step S410, the second control calculation section 623 determines whether the first power supply 401 and the second power supply 402 are normal, similarly to step S110 executed by the control calculation section 633 and step S310 executed by the first control calculation section 613, which have been described above. When the first power supply 401 and the second power supply 402 are normal, the processing proceeds to step S420. When the first power supply 401 or the second power supply 402 is abnormal, the processing proceeds to step S490.

In step S420 subsequent to step S410, the second control calculation section 623 determines whether the first control calculation section 613 is normal. Specifically, the second control calculation section 623 determines whether the second control calculation section 623 has received, from the first control calculation section 613, the signal indicating that the first control calculation section 613 is abnormal, output by the first control calculation section 613 in step S385, which has been described above. When the first control calculation section 613 is normal, the processing proceeds to step S430. When the first control calculation section 613 is abnormal, the processing proceeds to step S490.

In step S430 subsequent to step S420, the second control calculation section 623 determines whether the second control calculation section 623 itself is normal, similarly to step S120 executed by the control calculation section 633 and step S330 executed by the first control calculation section 613, which have been described above. Specifically, the second control calculation section 623 determines whether the second control calculation section 623 itself is normal by using the watchdog signal and the monitoring IC. When the second control calculation section 623 itself is normal, the processing proceeds to step S440. When the second control calculation section 623 itself is abnormal, the processing proceeds to step S485.

In step S440 subsequent to step S430, the second control calculation section 623 drives the second actuator 20, similarly to step S150 executed by the control calculation section 633, which has been described above.

Subsequently, in step S450, the second control calculation section 623 determines whether the second drive circuit 72 is normal based on the second hydraulic pressure P2 and the third hydraulic pressure P3, similarly to step S160 executed by the control calculation section 633, which has been described above. When the second drive circuit 72 is normal, the processing proceeds to step S455. When the second drive circuit 72 is abnormal, the processing proceeds to step S485. As described above, the second hydraulic pressure P2 is the pressure of the brake fluid flowing between the first differential pressure control valve 212 and each of the first pressure increase control valve 215 and the second pressure increase control valve 218. As described above, the third hydraulic pressure P3 is the pressure of the brake fluid flowing between the second differential pressure control valve 262 and each of the third pressure increase control valve 265 and the fourth pressure increase control valve 268.

In step S455 subsequent to step S450, the second control calculation section 623 determines whether the first sensor power supply line 821 and the second sensor power supply line 822 are normal, similarly to step S355 executed by the first control calculation section 613, which has been described above. Specifically, the second control calculation section 623 determines whether the first sensor power supply line 821 and the second sensor power supply line 822 are normal based on the first sensor output Vs1 and the second sensor output Vs2 obtained in step S400. When the first sensor power supply line 821 and the second sensor power supply line 822 are normal, the processing proceeds to step S460. When the first sensor power supply line 821 or the second sensor power supply line 822 is abnormal, the processing proceeds to step S485.

In step S460 subsequent to step S455, the second control calculation section 623 determines whether the first stroke sensor 861 is normal, similarly to step S360 executed by the first control calculation section 613, which has been described above. Specifically, the second control calculation section 623 determines whether the first sensor output Vs1 obtained in step S400 is equal to or higher than the first sensor threshold Vs_th1 and equal to or lower than the second sensor threshold Vs_th2. When the first sensor output Vs1 is equal to or higher than the first sensor threshold Vs_th1 and equal to or lower than the second sensor threshold Vs_th2, the first stroke sensor 861 is normal. Thus, the processing proceeds to step S465. When the first sensor output Vs1 is lower than the first sensor threshold Vs_th1, the first stroke sensor 861 is abnormal. Thus, the processing proceeds to step S485. When the first sensor output Vs1 is higher than the second sensor threshold Vs_th2, the first stroke sensor 861 is abnormal. Thus, the processing proceeds to step S485. At this time, similarly to the first stroke sensor 861, the second control calculation section 623 may determine whether the second stroke sensor 862 is normal based on the second sensor output Vs2 obtained in step S400.

In step S465 subsequent to step S460, the second control calculation section 623 determines whether the first stroke sensor 861 and the second stroke sensor 862 are normal, similarly to step S365 executed by the first control calculation section 613, which has been described above. Specifically, the second control calculation section 623 determines whether the first stroke sensor 861 and the second stroke sensor 862 are normal based on the sensor output difference Vs1-Vs2. When the first stroke sensor 861 and the second stroke sensor 862 are normal, the processing proceeds to step S470. When the first stroke sensor 861 or the second stroke sensor 862 is abnormal, the second control calculation section 623 determines which of the first stroke sensor 861 or the second stroke sensor 862 is abnormal. Then, the processing proceeds to step S485.

In step S470 subsequent to step S465, the second control calculation section 623 determines whether the first drive circuit 71 is normal. Specifically, the second control calculation section 623 determines whether the second control calculation section 623 has received the signal indicating that the first drive circuit 71 is abnormal, output by the first control calculation section 613 in step S385, which has been described above. When the first drive circuit 71 is normal, the processing proceeds to step S480. When the first drive circuit 71 is abnormal, the processing proceeds to step S490.

In step S480 subsequent to step S470, the second control calculation section 623 controls the second actuator 20, similarly to step S180 executed by the control calculation section 633, which has been described above. Specifically, the second control calculation section 623 performs the normal control, the ABS control, the VSC control, and the like. Then, the processing returns to step S400.

In step S485, when the second control calculation section 623 itself is abnormal, the second control calculation section 623 outputs the signal indicating that the second control calculation section 623 is abnormal to the first control calculation section 613. At this time, the second control calculation section 623 outputs the signal indicating that the second control calculation section 623 is abnormal to the notification device (not illustrated). When the notification device has received this signal, the notification device notifies the driver of the vehicle 6 that the second control calculation section 623 is abnormal.

When the second drive circuit 72 is abnormal, the second control calculation section 623 outputs the signal indicating that the second drive circuit 72 is abnormal to the first control calculation section 613. At this time, the second control calculation section 623 outputs the signal indicating that the second drive circuit 72 is abnormal to the notification device (not illustrated). When the notification device has received this signal, the notification device notifies the driver of the vehicle 6 that the second drive circuit 72 is abnormal.

When the first sensor power supply line 821 is abnormal, the second control calculation section 623 outputs a signal indicating that the first sensor power supply line 821 is abnormal to the notification device (not illustrated). When the notification device has received this signal, the notification device notifies the driver of the vehicle 6 that the first sensor power supply line 821 is abnormal through screen display, sound, light, and the like.

When the second sensor power supply line 822 is abnormal, the second control calculation section 623 outputs a signal indicating that the second sensor power supply line 822 is abnormal to the notification device (not illustrated). When the notification device has received this signal, the notification device notifies the driver of the vehicle 6 that the second sensor power supply line 822 is abnormal through screen display, sound, light, and the like.

When the first stroke sensor 861 is abnormal, the second control calculation section 623 outputs a signal indicating that the first stroke sensor 861 is abnormal to the notification device. When the notification device has received this signal, the notification device notifies the driver of the vehicle 6 that the first stroke sensor 861 is abnormal through screen display, sound, light, and the like.

When the second stroke sensor 862 is abnormal, the second control calculation section 623 outputs a signal indicating that the second stroke sensor 862 is abnormal to the notification device. When the notification device has received this signal, the notification device notifies the driver of the vehicle 6 that the second stroke sensor 862 is abnormal through screen display, sound, light, and the like. After step S485, the processing proceeds to step S490.

Subsequently, in step S490, when the first power supply 401 and the second power supply 402 are abnormal, when the second control calculation section 623 itself is abnormal, or when the second drive circuit 72 is abnormal, the second control calculation section 623 cannot control the second drive circuit 72 normally. Therefore, the vehicle 6 is controlled to decelerate and stop in order to ensure the safety of the vehicle 6 by another calculation section or the like that is different from the second control calculation section 623.

For example, in these cases, when the first control calculation section 613 and the first drive circuit 71 are normal, the first control calculation section 613 controls the first actuator 10 by controlling the first drive circuit 71, similarly to step S390 described above. As a result, the vehicle 6 safely decelerates and stops.

In these cases, when the first control calculation section 613 and the first drive circuit 71 are abnormal, the regenerative brake (not illustrated), the parking brake (not illustrated), and the like are controlled by another ECU that is different from the ECU 53, similarly to step S390 described above. As a result, the vehicle 6 safely decelerates and stops.

For example, when the first power supply 401, the second power supply 402, the second control calculation section 623, and the second drive circuit 72 are normal while the first control calculation section 613 or the first drive circuit 71 is abnormal, the second control calculation section 623 causes the vehicle 6 to decelerate and stop.

Specifically, the second control calculation section 623 outputs the signal for driving the second actuator 20 to the second drive circuit 72. The second drive circuit 72 drives the second actuator motor 30 based on the signal from the second control calculation section 623. The second actuator motor 30 rotates based on the signal from the second drive circuit 72 to drive the second pump 224 and the third pump 274.

At this time, the second pump 224 sucks the brake fluid stored in the first pressure adjustment reservoir 221. The sucked brake fluid flows between the first differential pressure control valve 212 and each of the first pressure increase control valve 215 and the second pressure increase control valve 218 after the brake fluid flows through the first return-flow pipe line 223. The brake fluid caused to flow by the second pump 224 flows to the left front wheel W/C 2 through the first pressure increase control valve 215. The brake fluid caused to flow by the second pump 224 flows to the right front wheel W/C 3 through the second pressure increase control valve 218.

At this time, the third pump 274 sucks the brake fluid stored in the second pressure adjustment reservoir 271. The sucked brake fluid flows between the second differential pressure control valve 262 and each of the third pressure increase control valve 265 and the fourth pressure increase control valve 268 after the brake fluid flows through the second return-flow pipe line 273. The brake fluid caused to flow by the third pump 274 flows to the right rear wheel W/C 5 through the third pressure increase control valve 265. The brake fluid caused to flow by the third pump 274 flows to the left rear wheel W/C 4 through the fourth pressure increase control valve 268.

Thus, each brake pad (not illustrated) comes into frictional contact with the corresponding brake disc. Therefore, each wheel that corresponds to each brake disc is decelerated, and thus the vehicle 6 decelerates. As a result, the vehicle 6 stops. After step S490, the processing returns to step S400.

In this manner, the processing of the second control calculation section 623 is executed.

Effects similar to those in the first embodiment are obtained also in the second embodiment. In the second embodiment, the vehicle brake system 1 includes the first microcomputer 61 and the second microcomputer 62. With this configuration, even if one of the first microcomputer 61 or the second microcomputer 62 fails, the vehicle 6 can be caused to decelerate and stop safely by using the other normal one. Therefore, the redundancy of the vehicle brake system 1 can be ensured, and thus the redundancy of the vehicle brake system 1 is improved.

In the second embodiment, the first control calculation section 613 determines whether the first sensor power supply line 821 is normal based on the first sensor output Vs1 of the first stroke sensor 861, V1, and V2. In addition, the second control calculation section 623 determines whether the second sensor power supply line 822 is normal based on the second sensor output Vs2 of the second stroke sensor 862, V1, and V2. Further, the first control calculation section 613 and the second control calculation section 623 determine whether the first stroke sensor 861 is normal based on the first sensor output Vs1 of the first stroke sensor 861, the first sensor threshold $Vs\_th1$, and the second sensor threshold $Vs\_th2$. The first control calculation section 613 and the second control calculation section 623 also determine whether the second stroke sensor 862 is normal based on the second sensor output Vs2 of the second stroke sensor 862, the first sensor threshold $Vs\_th1$, and the second sensor threshold $Vs\_th2$. With these determinations, a distinction can be made between the abnormality of the wiring lines and the abnormality of the sensors. As described above, V1, V2, the first sensor threshold $Vs\_th1$, and the second sensor threshold $Vs\_th2$ have the relationship of $V1 < Vs\_th1 < Vs\_th2 < V2$.

The first control calculation section 613 and the second control calculation section 623 determine whether the first stroke sensor 861 and the second stroke sensor 862 are normal based on the sensor output difference Vs1-Vs2. With this determination, the abnormality of the sensors is more likely to be detected.

The vehicle brake system 1 also includes the first stroke sensor 861 and the second stroke sensor 862. With this configuration, even if one of the first stroke sensor 861 or the second stroke sensor 862 fails, the vehicle 6 can be caused to decelerate and stop safely by using the other normal one. Therefore, the redundancy of the vehicle brake system 1 can be ensured, and thus the redundancy of the vehicle brake system 1 is improved.

Third Embodiment

In a third embodiment, the vehicle brake system 1 does not include the power supply switching circuit 403 while the vehicle brake system 1 includes two ECUs. Wiring lines of the first power supply 401 and the second power supply 402 are different. The others are similar to those of the second embodiment.

Figure 16:
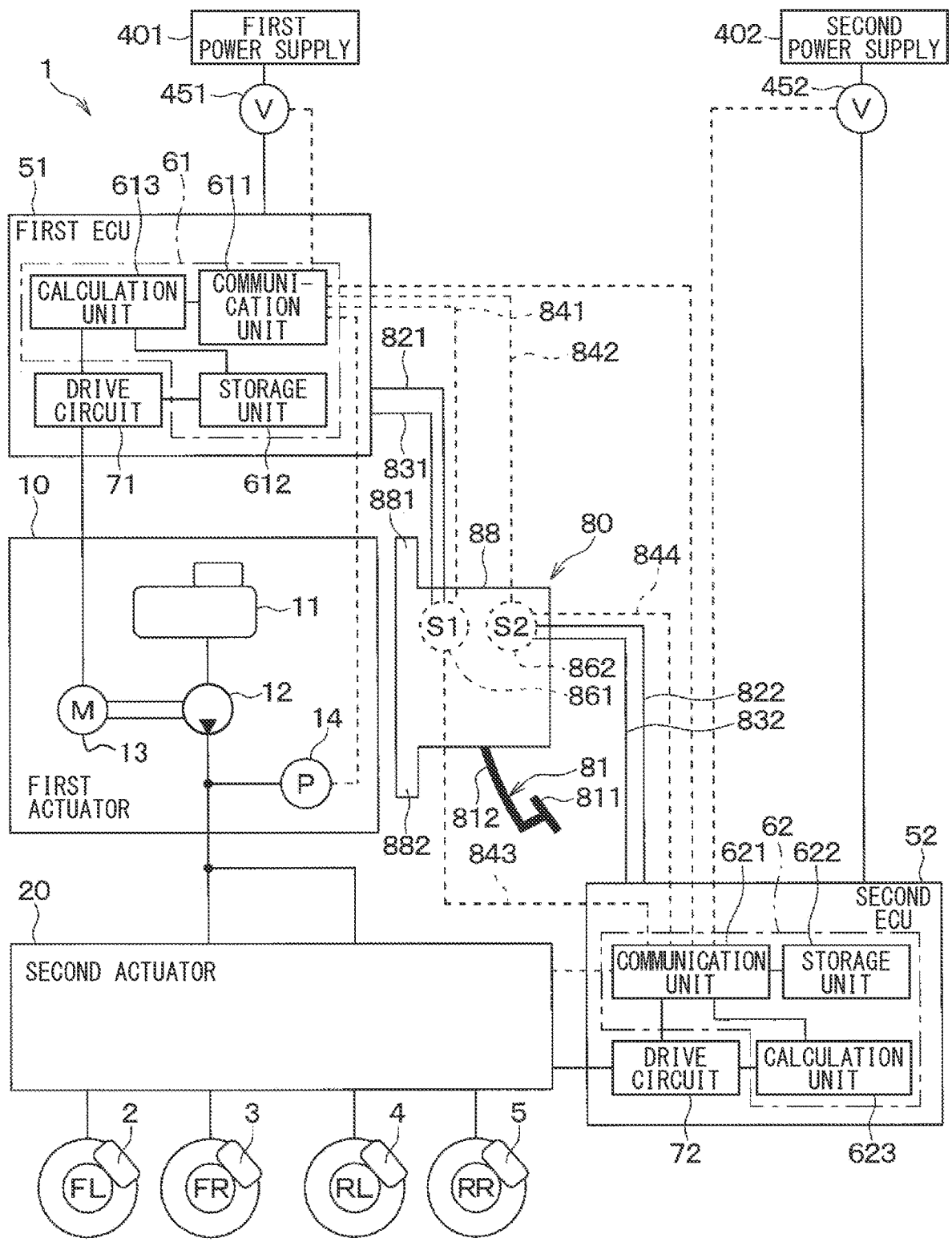
FIG. 16 is a configuration diagram of a vehicle brake system according to a third embodiment.
Figure 17:
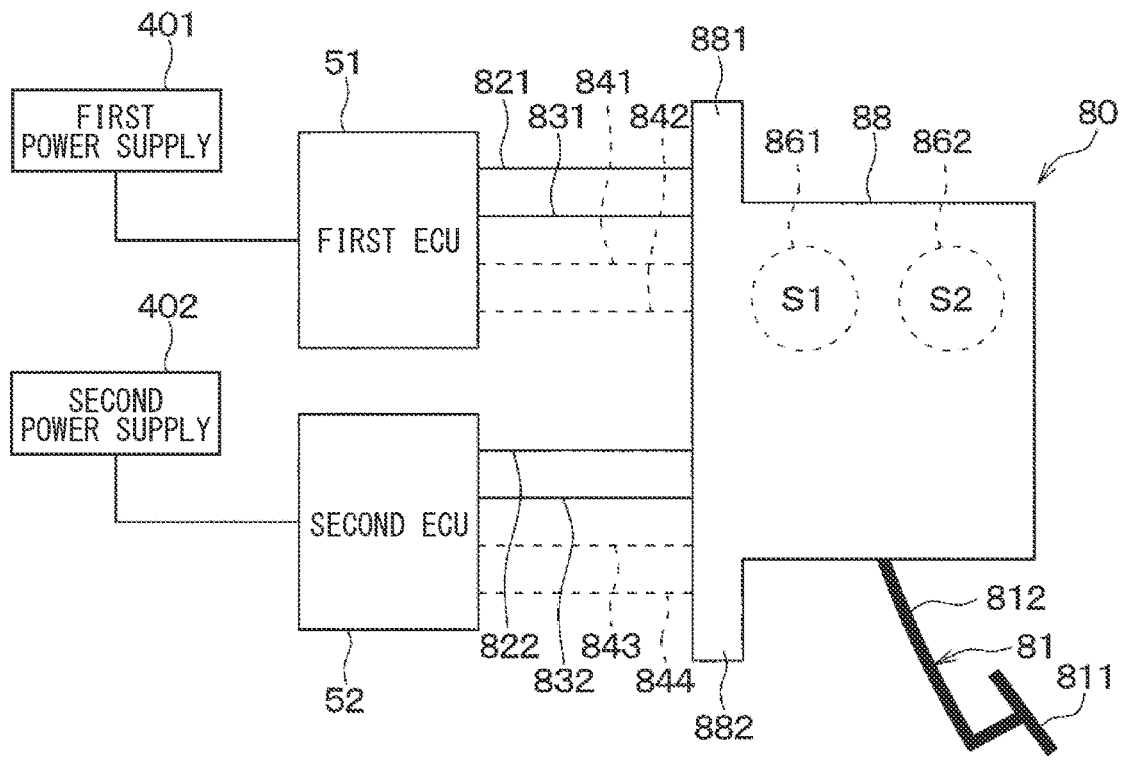
FIG. 17 is a wiring diagram of the vehicle brake system.

In the third embodiment, as illustrated in FIGS. 16 and 17, the vehicle brake system 1 further includes a first ECU 51 and a second ECU 52.

The first ECU 51 corresponds to a first hydraulic pressure control device, and controls the first actuator 10 by controlling the first actuator motor 13. Specifically, the first ECU 51 includes the first microcomputer 61 and the first drive circuit 71 described above.

The second ECU 52 corresponds to a second hydraulic pressure control device, and controls the second actuator 20 by controlling the second actuator motor 30. Specifically, the second ECU 52 includes the second microcomputer 62 and the second drive circuit 72 described above.

Here, the first power supply 401 supplies power to the first ECU 51.

The first voltage sensor 451 outputs, to the first ECU 51, a signal being in accordance with a voltage applied from the first power supply 401 to the first ECU 51.

The second power supply 402 supplies power to the second ECU 52.

The second voltage sensor 452 outputs, to the second ECU 52, a signal being in accordance with a voltage applied from the second power supply 402 to the second ECU 52.

The vehicle brake system 1 according to the third embodiment is configured as described above.

In the third embodiment, in step S310 executed by the first control calculation section 613, the first control calculation section 613 determines whether the first power supply 401 is normal. Specifically, the first control calculation section 613 determines whether the first voltage Vb1 obtained in step S300 is equal to or higher than the first voltage threshold Vb_th1 and equal to or lower than the second voltage threshold Vb_th2. When the first voltage Vb1 is equal to or higher than the first voltage threshold Vb_th1 and equal to or lower than the second voltage threshold Vb_th2, the first power supply 401 is normal. Thus, the processing proceeds to step S320. When the first voltage Vb1 is lower than the first voltage threshold Vb_th1, the first power supply 401 is abnormal. Thus, the processing proceeds to step S390. When the first voltage Vb1 is higher than the second voltage threshold Vb_th2, the first power supply 401 is abnormal. Thus, the processing proceeds to step S390. The other processing is similar to that described above.

In step S410 executed by the second control calculation section 623, the second control calculation section 623 determines whether the second power supply 402 is normal. Specifically, the second control calculation section 623 determines whether the second voltage Vb2 obtained in step S400 is equal to or higher than the first voltage threshold Vb_th1 and equal to or lower than the second voltage threshold Vb_th2. When the second voltage Vb2 is equal to or higher than the first voltage threshold Vb_th1 and equal to or lower than the second voltage threshold Vb_th2, the second power supply 402 is normal. Thus, the processing proceeds to step S420. When the second voltage Vb2 is lower than the first voltage threshold Vb_th1, the second power supply 402 is abnormal. Thus, the processing proceeds to step S490. When the second voltage Vb2 is higher than the second voltage threshold Vb_th2, the second power supply 402 is abnormal. Thus, the processing proceeds to step S490. The other processing is similar to that described above.

Effects similar to those in the second embodiment are obtained also in the third embodiment.

Fourth Embodiment

Figure 18:
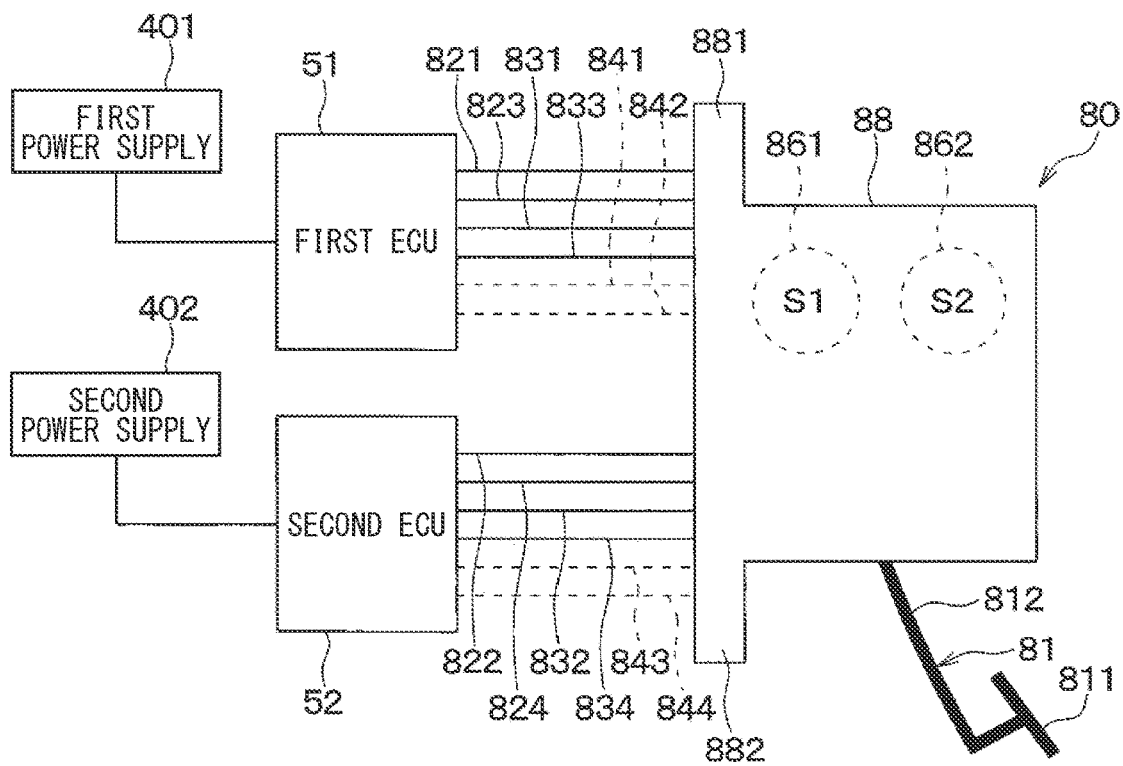
FIG. 18 is a wiring diagram of a vehicle brake system according to a fourth embodiment.

In a fourth embodiment, as illustrated in FIG. 18, the vehicle brake device 80 further includes a third sensor power supply line 823, a third sensor ground line 833, a fourth sensor power supply line 824, and a fourth sensor ground line 834. The others are similar to those of the third embodiment.

The third sensor power supply line 823 is connected in a manner similar to the first sensor power supply line 821, and is connected to the first ECU 51 and the first stroke sensor 861.

The third sensor ground line 833 is connected in a manner similar to the first sensor ground line 831, and is connected to the first ECU 51 and the first stroke sensor 861.

The fourth sensor power supply line 824 is connected in a manner similar to the second sensor power supply line 822, and is connected to the second ECU 52 and the second stroke sensor 862.

The fourth sensor ground line 834 is connected in a manner similar to the second sensor ground line 832, and is connected to the second ECU 52 and the second stroke sensor 862.

Effects similar to those in the third embodiment are obtained also in the fourth embodiment. In the fourth embodiment, the vehicle brake device 80 further includes the third sensor power supply line 823, the third sensor ground line 833, the fourth sensor power supply line 824, and the fourth sensor ground line 834. With this configuration, even if any of the wiring lines described above is disconnected, power is supplied to the first stroke sensor 861 and the second stroke sensor 862 through the normal wiring lines. Therefore, the redundancy of the vehicle brake system 1 can be ensured, and thus the redundancy of the vehicle brake system 1 is improved.

Fifth Embodiment

In a fifth embodiment, the vehicle brake device 80 does not include the first sensor output line 841, the second sensor output line 842, the third sensor output line 843, and the fourth sensor output line 844, while the vehicle brake device 80 includes the fifth sensor output line 845 and the sixth sensor output line 846. The others are similar to those of the third embodiment.

Figure 19:
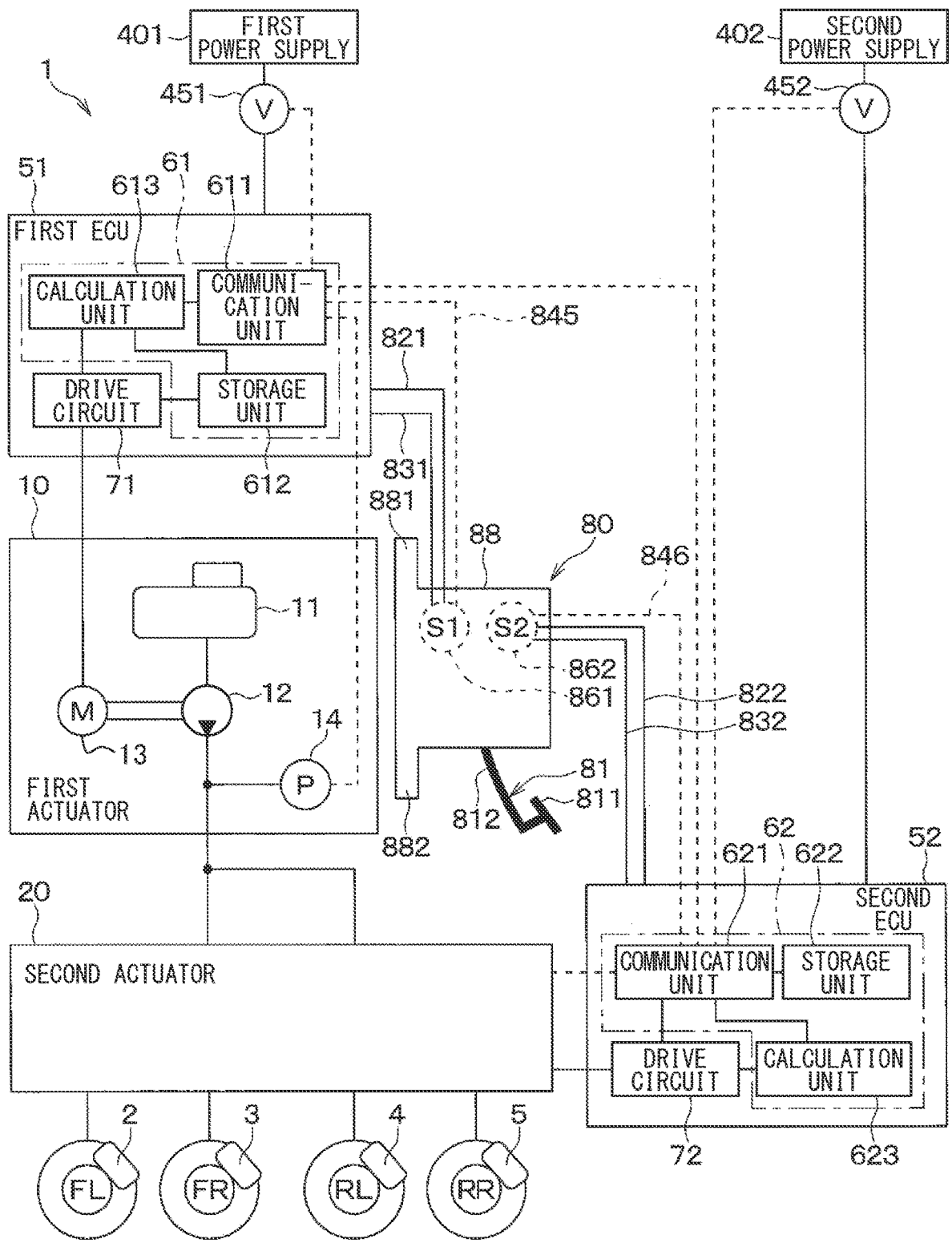
FIG. 19 is a configuration diagram of a vehicle brake system according to a fifth embodiment.
Figure 20:
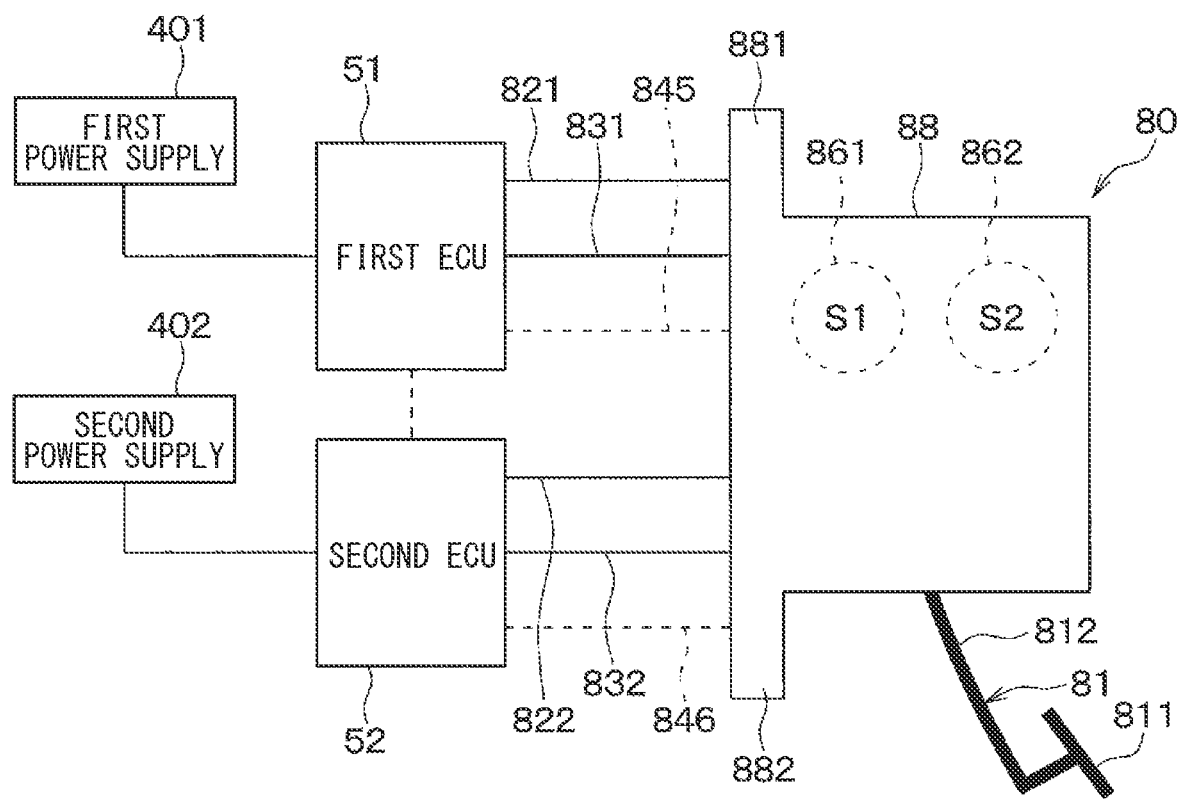
FIG. 20 is a wiring diagram of the vehicle brake system.

As illustrated in FIGS. 19 and 20, the fifth sensor output line 845 is connected to the first ECU 51 and the first stroke sensor 861.

The sixth sensor output line 846 is connected to the second ECU 52 and the second stroke sensor 862.

In this case, in step S300, the first control calculation section 613 obtains the first sensor output Vs1 that corresponds to the stroke amount X of the brake pedal 81 from the first stroke sensor 861 through the fifth sensor output line 845 and the first communication section 611. In step S300, the first control calculation section 613 also obtains the second sensor output Vs2 that corresponds to the stroke amount X of the brake pedal 81 by wirelessly communicating with the second ECU 52. The other processing is similar to that described above.

In step S400, the second control calculation section 623 obtains the second sensor output Vs2 that corresponds to the stroke amount X of the brake pedal 81 from the second stroke sensor 862 through the sixth sensor output line 846 and the second communication section 621. In step S400, the second control calculation section 623 also obtains the first sensor output Vs1 that corresponds to the stroke amount X of the brake pedal 81 by wirelessly communicating with the first ECU 51. The other processing is similar to that described above.

Effects similar to those in the third embodiment are obtained also in the fifth embodiment. In the fifth embodiment, the number of wiring lines can be reduced as compared to that in the third embodiment. Thus, weight of the vehicle brake device 80 and cost such as material cost can be reduced.

Sixth Embodiment

Figure 21:
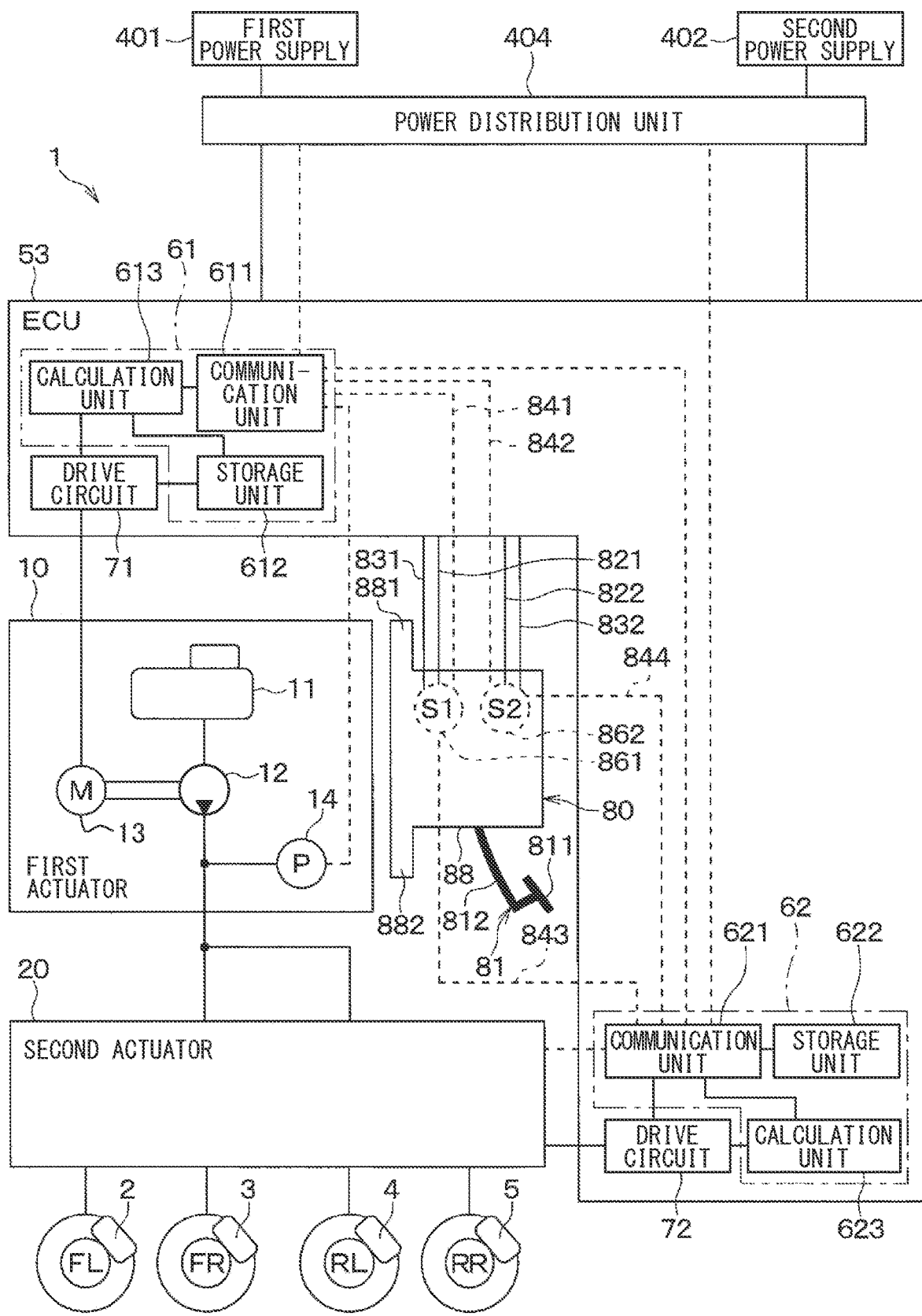
FIG. 21 is a configuration diagram of a vehicle brake system according to a sixth embodiment.

In a sixth embodiment, the vehicle brake system 1 does not include the power supply switching circuit 403, the first voltage sensor 451, and the second voltage sensor 452 while the vehicle brake system 1 includes a power distribution unit 404 as illustrated in FIG. 21. The others are similar to those of the second embodiment.

The power distribution unit 404 receives power supply from the first power supply 401 and the second power supply 402. The power distribution unit 404 includes a power distribution circuit (not illustrated), and receives power supplied from the first power supply 401 and the second power supply 402. The power distribution unit 404 distributes the received power to the first microcomputer 61 and the second microcomputer 62.

Figure 22:
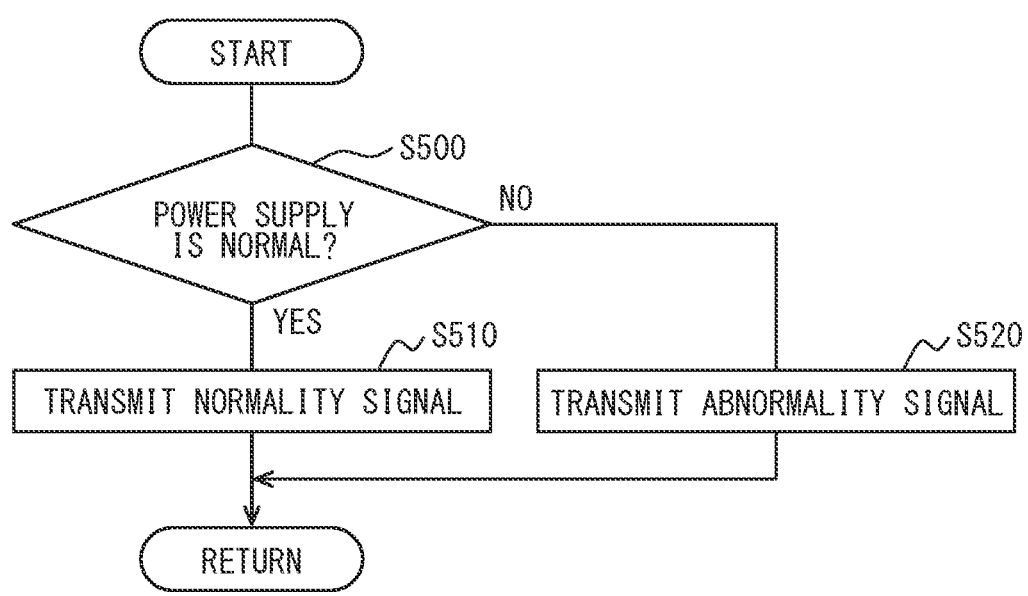
FIG. 22 is a flowchart of a power distribution unit.

The power distribution unit 404 further includes a microcomputer (not illustrated), a ROM (not illustrated), a voltage sensor (not illustrated), and the like. When the ignition of the vehicle 6 is turned on, the power distribution unit 404 distributes the power supplied from the first power supply 401 and the second power supply 402 to the first microcomputer 61 and the second microcomputer 62. At this time, the power distribution unit 404 determines whether the first power supply 401 and the second power supply 402 are normal by executing a program stored in the ROM of the power distribution unit 404. Hereinafter, the determination of the power distribution unit 404 will be described with reference to a flowchart of FIG. 22.

In step S500, the power distribution unit 404 determines whether the first power supply 401 and the second power supply 402 are normal. Specifically, the voltage sensor (not illustrated) of the power distribution unit 404 measures a voltage applied from the first power supply 401 to the power distribution unit 404. The voltage sensor (not illustrated) of the power distribution unit 404 also measures a voltage applied from the second power supply 402 to the power distribution unit 404. Then, the power distribution unit 404 determines whether each of these measured voltages is equal to or higher than a first distribution-used voltage threshold and equal to or lower than a second distribution-used voltage threshold. When each of the measured voltages is equal to or higher than the first distribution-used voltage threshold and equal to or lower than the second distribution-used voltage threshold, the first power supply 401 and the second power supply 402 are normal. Thus, the processing proceeds to step S510. When one of the measured voltages is lower than the first distribution-used voltage threshold, the first power supply 401 or the second power supply 402 is abnormal. Thus, the processing proceeds to step S520. When one of the measured voltages is higher than the second distribution-used voltage threshold, the first power supply 401 or the second power supply 402 is abnormal. Thus, the processing proceeds to step S520.

In step S510 subsequent to step S500, the power distribution unit 404 transmits a normality signal indicating that the first power supply 401 and the second power supply 402 are normal to the first microcomputer 61 and the second microcomputer 62. Then, the processing returns to step S500.

In step S520 subsequent to step S500, the power distribution unit 404 transmits an abnormality signal indicating that the first power supply 401 or the second power supply 402 is abnormal (for example, the first power supply 401 or the second power supply 402 is disconnected) to the first microcomputer 61 and the second microcomputer 62. Then, the processing returns to step S500.

Then, in step S310, the first control calculation section 613 determines whether the first power supply 401 and the second power supply 402 are normal based on the normality signal and the abnormality signal from the power distribution unit 404. The other processing is similar to that described above.

In step S410, the second control calculation section 623 determines whether the first power supply 401 and the second power supply 402 are normal based on the normality signal and the abnormality signal from the power distribution unit 404. The other processing is similar to that described above.

In this manner, the processing of the power distribution unit 404, the first control calculation section 613, and the second control calculation section 623 is executed.

Effects similar to those in the second embodiment are obtained also in the sixth embodiment.

Seventh Embodiment

In a seventh embodiment, the pressure of the brake fluid from the reservoir 11 is increased without using the first pump 12. The others are similar to those of the first embodiment.

Figure 23:
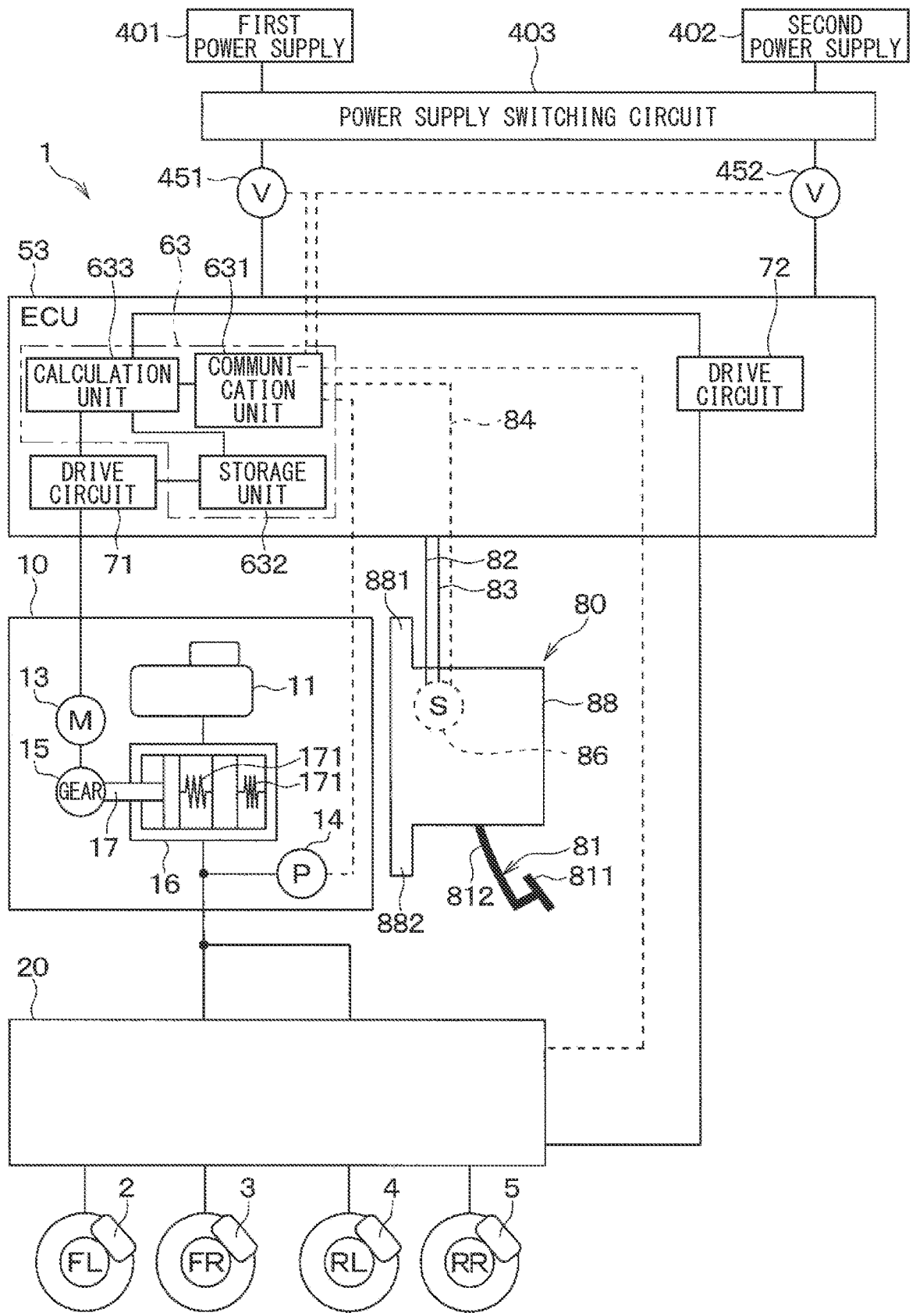
FIG. 23 is a configuration diagram of a vehicle brake system according to a seventh embodiment.

As illustrated in FIG. 23, the first actuator 10 includes a gear mechanism 15, an actuator cylinder 16, and an actuator piston 17 in addition to the reservoir 11, the first actuator motor 13, and the first pressure sensor 14 described above.

The gear mechanism 15 has a ball screw and a rack and pinion. The gear mechanism 15 is connected to the first actuator motor 13. Thus, the gear mechanism 15 is caused to perform translational movement by rotation of the first actuator motor 13.

The actuator cylinder 16 is formed in a bottomed cylindrical shape, and is connected to the reservoir 11. Thus, brake fluid in the reservoir 11 flows into the actuator cylinder 16 through a hole (not illustrated) of the reservoir 11 and a hole (not illustrated) of the actuator cylinder 16.

The actuator piston 17 is connected to the gear mechanism 15, and has a plurality of actuator springs 171. With this configuration, when the gear mechanism 15 is caused to translate by the rotation of the first actuator motor 13, the actuator piston 17 is caused to perform translational movement along with the gear mechanism 15. As a result, the actuator piston 17 slides in the actuator cylinder 16 along an axial direction of the actuator cylinder 16. When the actuator piston 17 slides, a pressure of the brake fluid in the actuator cylinder 16 is increased. Simultaneously, another hole (not illustrated) of the actuator cylinder 16, which is connected to the first main pipe line 211 and the second main pipe line 261, is opened. At this time, the brake fluid with the increased hydraulic pressure flows from the other hole (not illustrated) of the actuator cylinder 16 toward the second actuator 20.

When the power supply is stopped from the first drive circuit 71 to the first actuator motor 13, the first actuator motor 13 stops its rotation. When the rotation of the first actuator motor 13 is stopped, the actuator piston 17 is caused to perform the translational movement along with the gear mechanism 15 by a restoration force of the plurality of actuator springs 171. As a result, the actuator piston 17 returns to the initial position.

Effects similar to those in the first embodiment are obtained also in the seventh embodiment.

Eighth Embodiment

Figure 24:
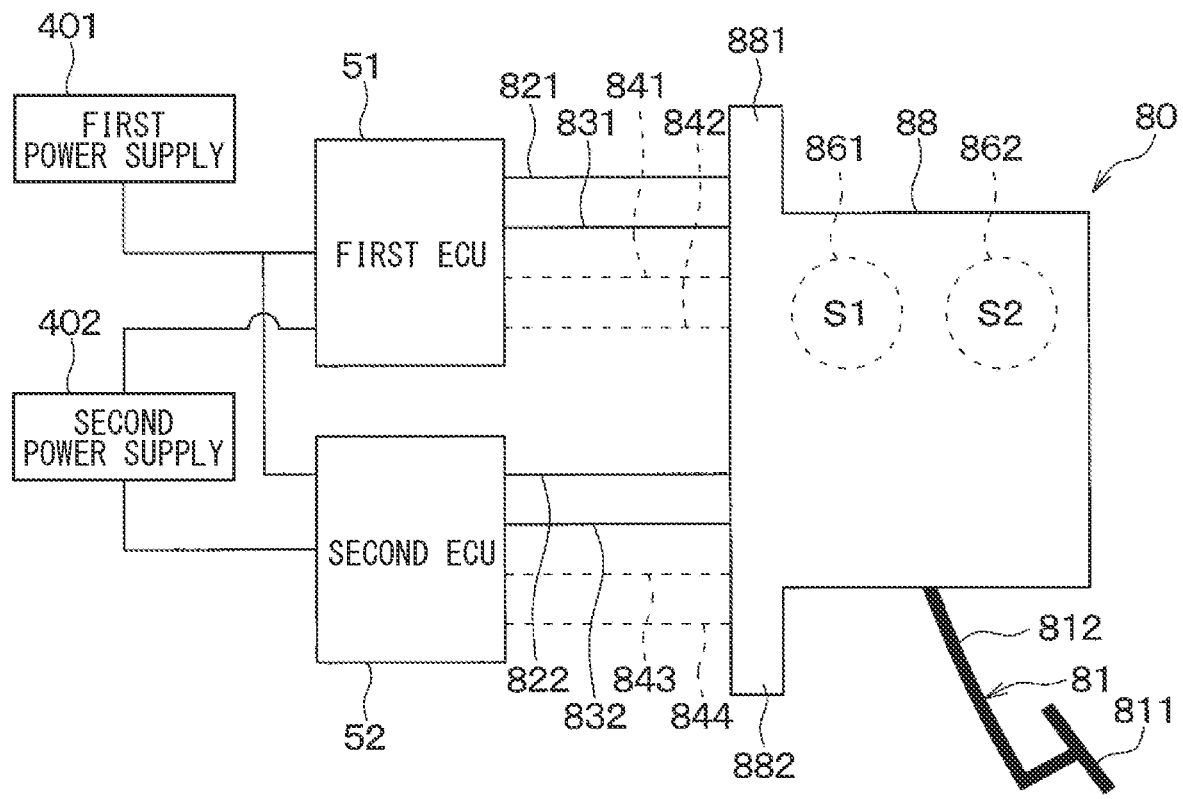
FIG. 24 is a wiring diagram of a vehicle brake system according to an eighth embodiment.

In an eighth embodiment, as illustrated in FIG. 24, the first power supply 401 supplies power to the first ECU 51 and the second ECU 52. The second power supply 402 supplies power to the first ECU 51 and the second ECU 52. The others are similar to those of the third embodiment.

Effects similar to those in the third embodiment are obtained also in the eighth embodiment.

OTHER EMBODIMENTS

The present disclosure is not limited to the above embodiments, and may be appropriately modified from the above embodiments. In the above embodiments, it goes without saying that the constituent elements forming the embodiments are not necessarily indispensable unless otherwise clearly stated or unless otherwise thought to be clearly indispensable in principle.

Each control unit and the like, and each method thereof described in the present disclosure may be implemented by a dedicated computer provided by including a processor and a memory programmed to execute one or more functions embodied by a computer program. Alternatively, each control unit and the like, and each method thereof described in the present disclosure may be implemented by a dedicated computer provided by including a processor with one or more dedicated hardware logic circuits. Alternatively, each control unit and the like, and each method thereof described in the present disclosure may be implemented by one or more dedicated computers configured by a combination of a processor and a memory programmed to execute one or more functions, and a processor with one or more hardware logic circuits. The computer program may be stored in a computer-readable non-transitory tangible storage medium as an instruction to be executed by the computer.

(1) In the above embodiments, the vehicle brake system 1 includes the first power supply 401 and the second power supply 402. With regard to this configuration, the number of power supplies is not limited to one or two, and may be three or more.

(2) In the above embodiments, the vehicle brake system 1 includes the microcomputer 63. Alternatively, the vehicle brake system 1 includes the first microcomputer 61 and the second microcomputer 62. The number of microcomputers is not limited to one or two, and may be three or more.

(3) In the above embodiments, the vehicle brake system 1 includes the first actuator 10, which corresponds to the first hydraulic pressure generation unit, and the second actuator 20, which corresponds to the second hydraulic pressure generation unit. The number of hydraulic pressure generation units is not limited to two, and may be three or more.

(4) In the above embodiments, the vehicle brake system 1 includes the first drive circuit 71 and the second drive circuit 72. The number of drive circuits is not limited to two, and may be one, or three or more.

(5) In the above embodiments, the vehicle brake device 80 includes the sensor power supply line 82, the sensor ground line 83, the first sensor output line 841, and the second sensor output line 842. The number of wiring lines for each type is not limited to one or two, and may be three or more.

(6) In the above embodiments, the vehicle brake device 80 includes the stroke sensor 86. Alternatively, the vehicle brake device 80 includes the first stroke sensor 861 and the second stroke sensor 862. With regard to these configurations, the number of stroke sensors is not limited to one or two, and may be three or more.

(7) In the above embodiments, the reaction force generation portion 90 of the vehicle brake device 80 includes the elastic member 91. With regard to this configuration, the number of elastic members 91 is not limited to one, and may be two or more.

(8) The first to eighth embodiments may be appropriately combined.

Figure 25:
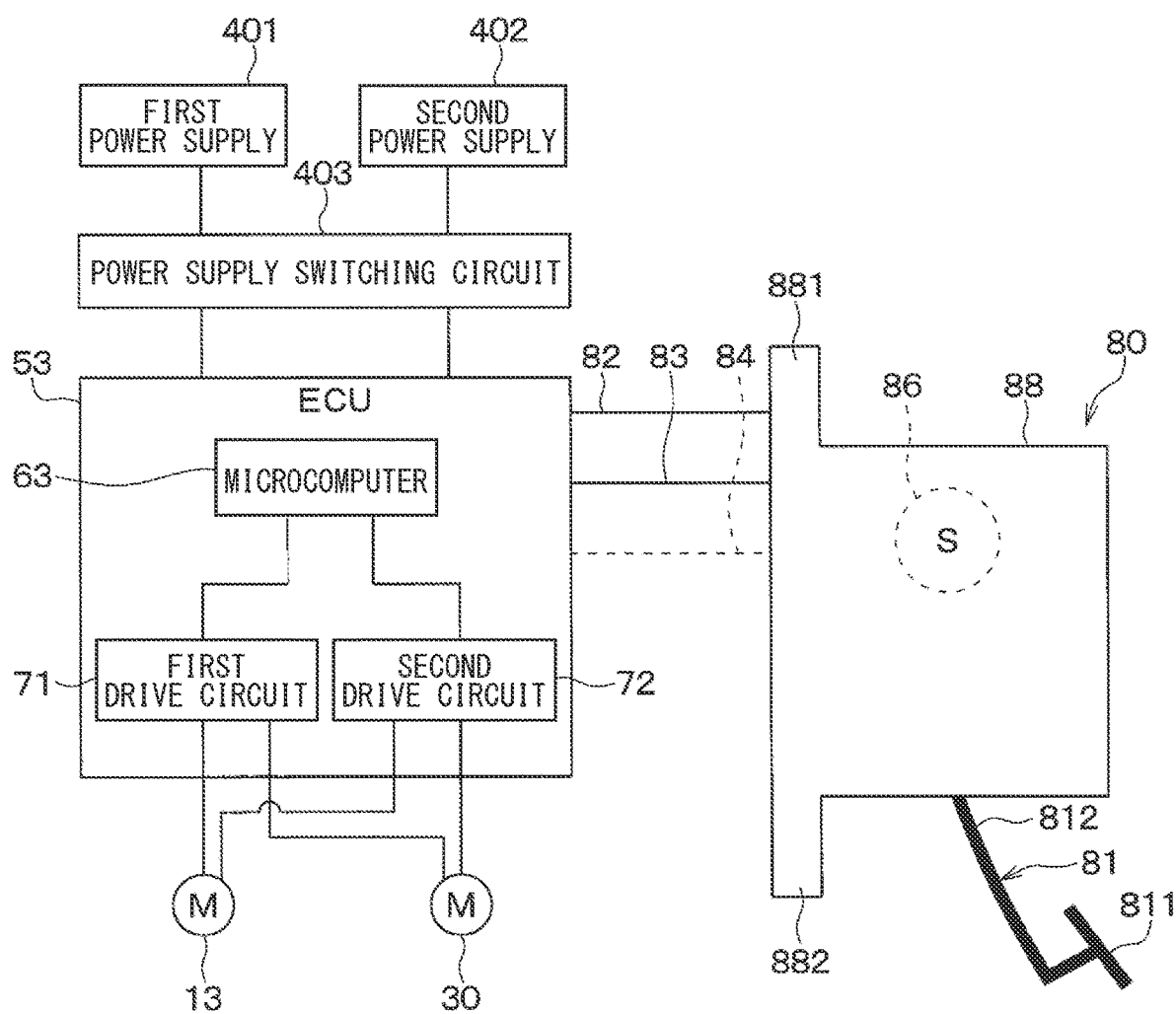
FIG. 25 is a wiring diagram of a vehicle brake system according to another embodiment.

As illustrated in FIG. 25, in addition to the driving of the first actuator 10, the first drive circuit 71 may drive the second actuator 20 by supplying power to the second actuator motor 30 based on a signal from the control calculation section 633. In addition to the driving of the second actuator 20, the second drive circuit 72 may drive the first actuator 10 by supplying power to the first actuator motor 13 based on a signal from the control calculation section 633.

(9) In the above embodiments, the elastic member 91 is the helical compression spring. Unlike this configuration, the elastic member 91 may be a tension spring. In addition, the elastic member 91 may not be limited to an equal pitch spring, and may be a conical spring, an unequal pitch spring, or the like.

What is claimed is:

1. A vehicle brake system comprising:
   a vehicle brake device including
      a brake pedal that has a pedal portion, and a lever portion rotating about a rotation axis in response to the pedal portion being operated,
      a first stroke sensor configured to output a first signal based on a stroke amount of the brake pedal,
      a second stroke sensor configured to output a second signal based on the stroke amount of the brake pedal,
      a housing that rotatably supports the lever portion, and
      a reaction force generation portion configured to generate a reaction force applied on the lever portion based on the stroke amount;
   a first hydraulic pressure generation unit configured to generate a hydraulic pressure for braking a vehicle;

a second hydraulic pressure generation unit configured to generate hydraulic pressure for braking the vehicle;

a first hydraulic pressure control device that includes a first drive circuit configured to drive the first hydraulic pressure generation unit;

a second hydraulic pressure control device that includes a second drive circuit configured to drive the second hydraulic pressure generation unit;

a first power supply configured to supply power to the first hydraulic pressure control device;

a second power supply configured to supply power to the second hydraulic pressure control device;

a power supply switching circuit configured to switch a power supply source that supplies the power to the first hydraulic pressure control device and the second hydraulic pressure control device, between the first power supply and the second power supply based on a first voltage that is a voltage applied from the first power supply to the first hydraulic pressure control device and a second voltage that is a voltage applied from the second power supply to the second hydraulic pressure control device;

a first sensor power supply line that is connected to the first hydraulic pressure control device and the first stroke sensor, and configured to supply the power from the first power supply, from the first hydraulic pressure control device to the first stroke sensor;

a second sensor power supply line that is connected to the second hydraulic pressure control device and the second stroke sensor, and configured to supply the power from the second power supply, from the second hydraulic pressure control device to the second stroke sensor;

a third sensor power supply line that is connected to the first hydraulic pressure control device and the first stroke sensor, and configured to supply the power from the first power supply, from the first hydraulic pressure control device to the first stroke sensor;

a fourth sensor power supply line that is connected to the second hydraulic pressure control device and the second stroke sensor, and configured to supply the power from the second power supply, from the second hydraulic pressure control device to the second stroke sensor;

a first sensor output line that is connected to the first hydraulic pressure control device and the first stroke sensor, and configured to transmit the first signal from the first stroke sensor to the first hydraulic pressure control device;

a second sensor output line that is connected to the first hydraulic pressure control device and the second stroke sensor, and configured to transmit the second signal from the second stroke sensor to the first hydraulic pressure control device;

a third sensor output line that is connected to the second hydraulic pressure control device and the first stroke sensor, and configured to transmit the first signal from the first stroke sensor to the second hydraulic pressure control device;

a fourth sensor output line that is connected to the second hydraulic pressure control device and the second stroke sensor, and configured to transmit the second signal from the second stroke sensor to the second hydraulic pressure control device, wherein the first hydraulic pressure control device is configured to determine whether the first stroke sensor and the second stroke sensor are normal based on the first signal from the first stroke sensor transmitted through the first sensor output line and the second signal from the second stroke sensor transmitted through the second sensor output line, and when the first stroke sensor and the second stroke sensor are normal, control the first drive circuit based on at least one of the first signal from the first stroke sensor or the second signal from the second stroke sensor to control the hydraulic pressure generated by the first hydraulic pressure generation unit, and the second hydraulic pressure control device is configured to determine whether the first stroke sensor and the second stroke sensor are normal based on the first signal from the first stroke sensor transmitted through the third sensor output line and the second signal from the second stroke sensor transmitted through the fourth sensor output line, and when the first stroke sensor and the second stroke sensor are normal, control the second drive circuit based on at least one of the first signal from the first stroke sensor or the second signal from the second stroke sensor to control the hydraulic pressure generated by the second hydraulic pressure generation unit.

2. The vehicle brake system according to claim 1, wherein the first and second hydraulic pressure control devices includes a first hydraulic pressure control unit configured to control the hydraulic pressure generated by the first hydraulic pressure generation unit, by controlling the first drive circuit based on the first signal from the first stroke sensor, and a second hydraulic pressure control unit configured to control the hydraulic pressure generated by the second hydraulic pressure generation unit, by controlling the second drive circuit based on the second signal from the second stroke sensor.

* * * * *